(12) United States Patent
Chiu

(10) Patent No.: US 6,553,713 B2
(45) Date of Patent: Apr. 29, 2003

(54) METHOD AND DEVICES FOR FORESTATION AND FLOOD PREVENTION

(76) Inventor: Chui-Wen Chiu, 9 Nordic Place, Toronto (CA), M3A-2H8

( * ) Notice: Subject to any disclaimer, the term of this patent is extended or adjusted under 35 U.S.C. 154(b) by 0 days.

(21) Appl. No.: 10/140,193

(22) Filed: May 8, 2002

(65) Prior Publication Data

US 2002/0129547 A1 Sep. 19, 2002

Related U.S. Application Data

(62) Division of application No. 09/729,283, filed on May 12, 2002.

(51) Int. Cl.[7] ................................................. A01G 9/00
(52) U.S. Cl. ................................. 47/17; 47/20.1; 47/69
(58) Field of Search ............................. 47/17, 19, 19.1, 47/19.2, 20.1, 21.1, 22.1, 32.1, 29.1, 29.5, 69, 74, 79

(56) References Cited

U.S. PATENT DOCUMENTS

| | | | |
|---|---|---|---|
| 293,577 A | * | 2/1884 | Howe |
| 3,446,272 A | * | 5/1969 | Gaines |
| 3,755,962 A | * | 9/1973 | Walters et al. ................. 47/34 |
| 4,031,832 A | * | 6/1977 | Edwards ......................... 47/34 |
| 4,306,542 A | * | 12/1981 | Reinert ........................ 126/429 |
| 4,333,265 A | * | 6/1982 | Arnold ........................... 47/74 |
| 4,396,872 A | * | 8/1983 | Nutter .......................... 315/308 |
| 4,462,390 A | * | 7/1984 | Holdrige et al. ............ 126/430 |
| 5,488,801 A | * | 2/1996 | Nix ................................. 47/60 |
| 5,601,236 A | * | 2/1997 | Wold ............................ 239/63 |
| 5,669,177 A | * | 9/1997 | Frounfelker .................... 47/21 |
| 6,006,471 A | * | 12/1999 | Sun ................................ 47/69 |
| 6,378,247 B1 | * | 4/2002 | Takahashi ...................... 47/75 |

FOREIGN PATENT DOCUMENTS

| | | | | |
|---|---|---|---|---|
| EP | 0451682 A1 | * | 4/1991 | ............ A01G/9/00 |
| FR | 2604333 A1 | * | 4/1988 | ............ A01G/9/24 |

* cited by examiner

*Primary Examiner*—Peter M. Poon
*Assistant Examiner*—Andrea M. Valenti

(57) ABSTRACT

Plastic bags are continuously formed and filled with sand, soil and gravel to fabricate flexible soft bricks of various shapes and configurations which may be laid on the ground to stabilize sand for growing vegetation or to prevent soil depletion due to water erosion or to grow vegetation in them. Protective housings made of plastic membrane material may be erected in dry or desert regions for growing trees and vegetation. The lower portion of the housing may be located below ground into a trench. Self operating knives are located in the housing to sever the plastic membrane material when the tree grown in the housing has reached a predetermined maturity. Tree planting bullets are provided to facilitate forestation by airplane to land inaccessible regions. The tree seedling is located in supported in an embryonic sack located in a depression formed in the rear portion of the bullet head.

10 Claims, 24 Drawing Sheets

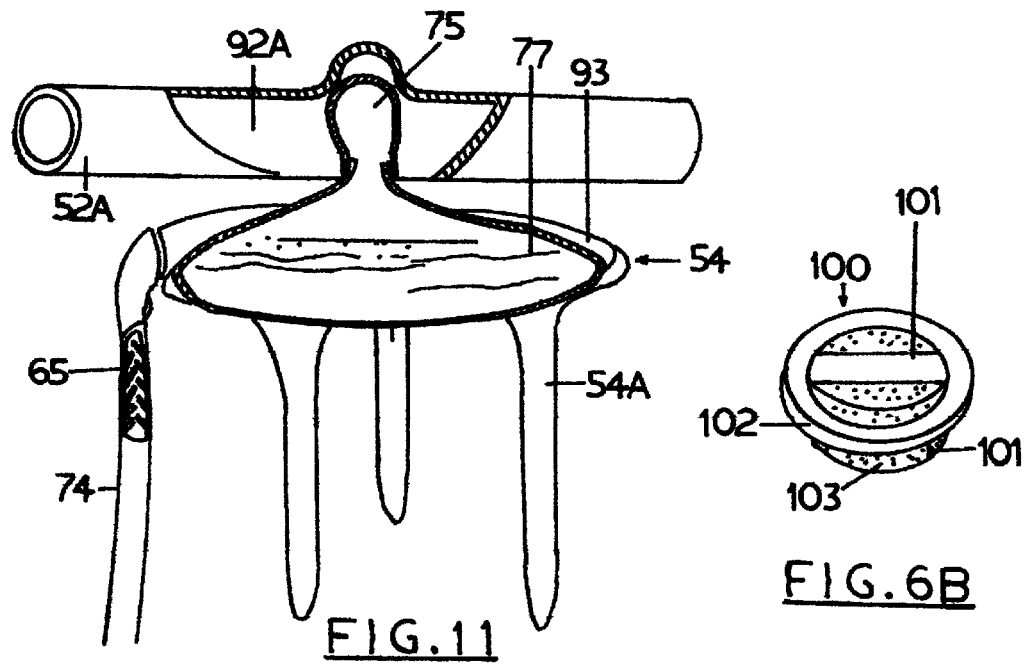
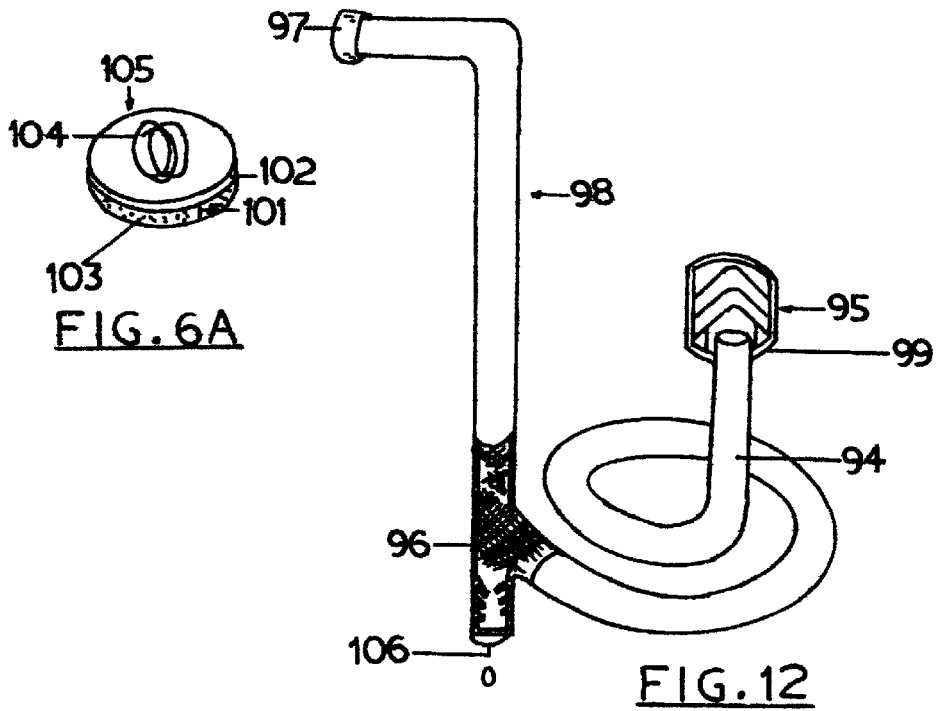

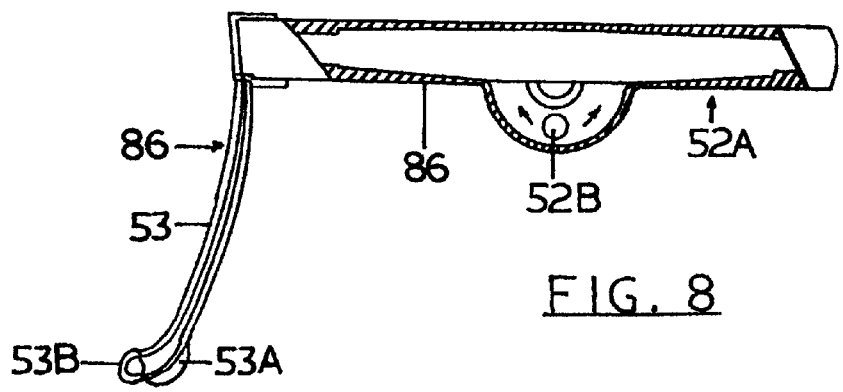
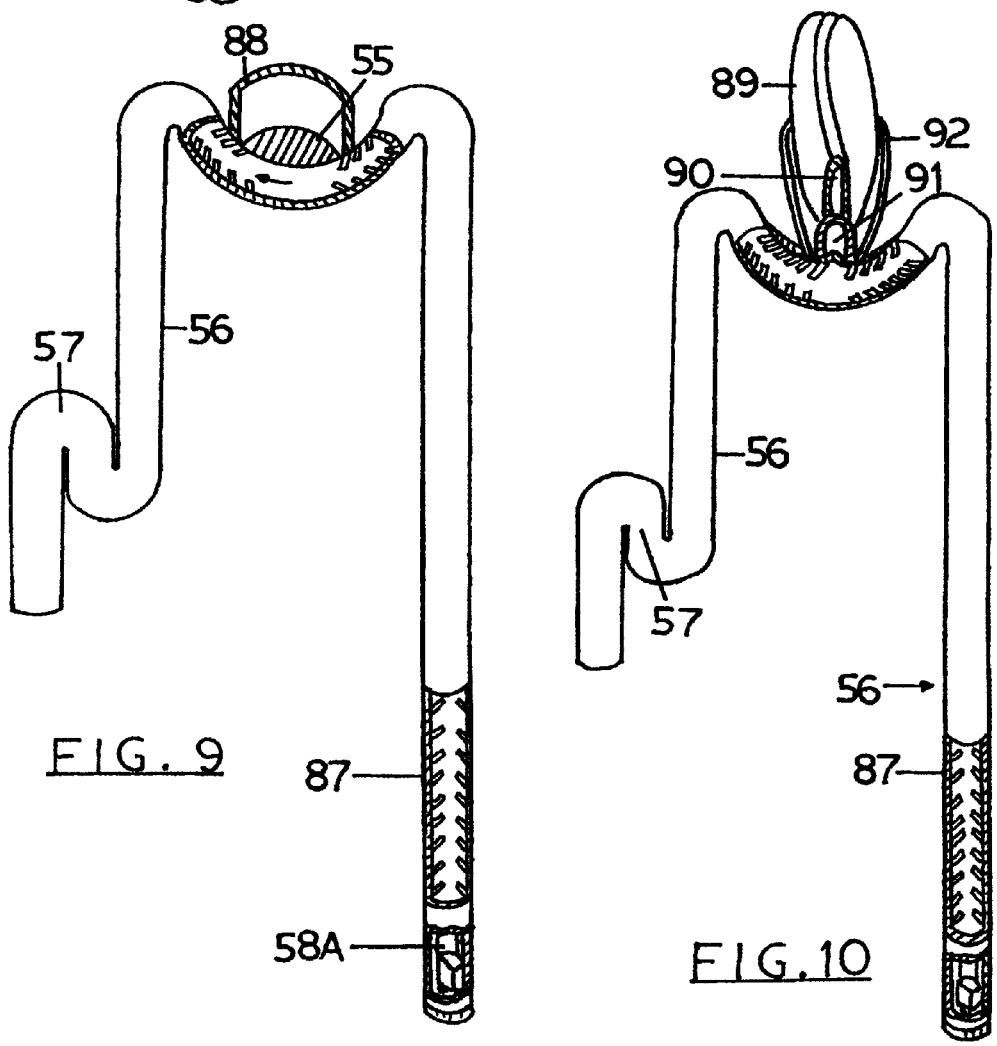

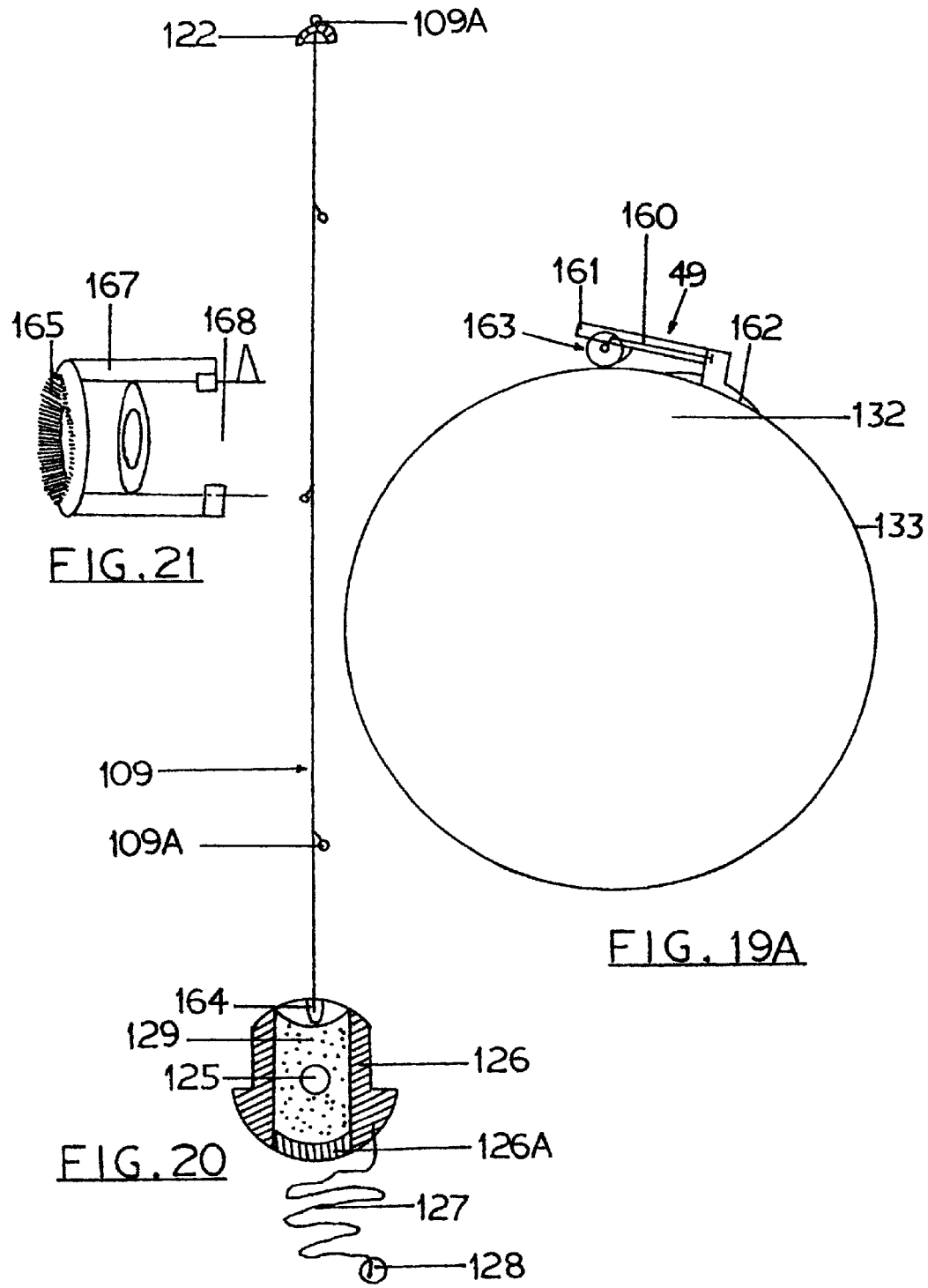

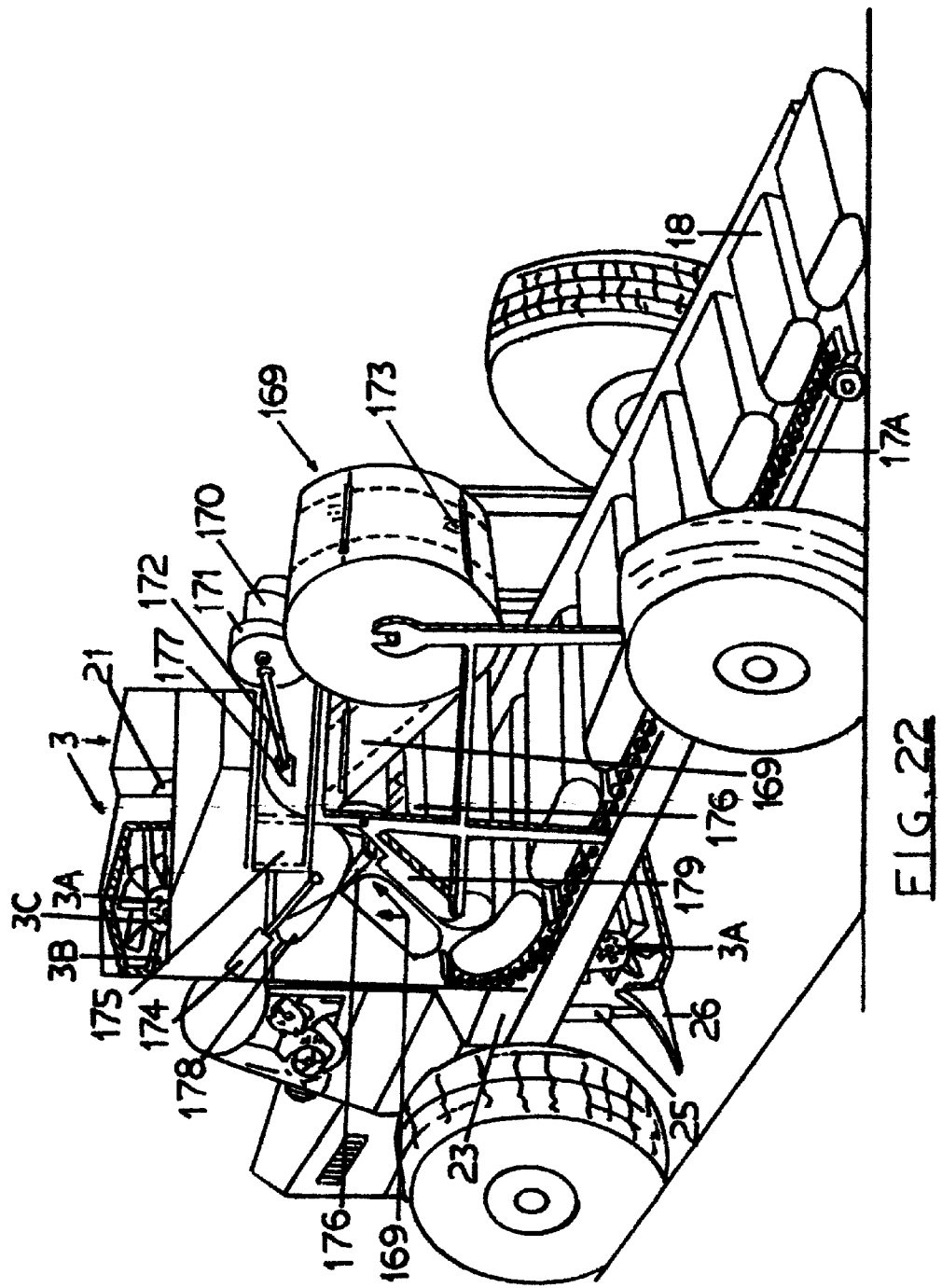

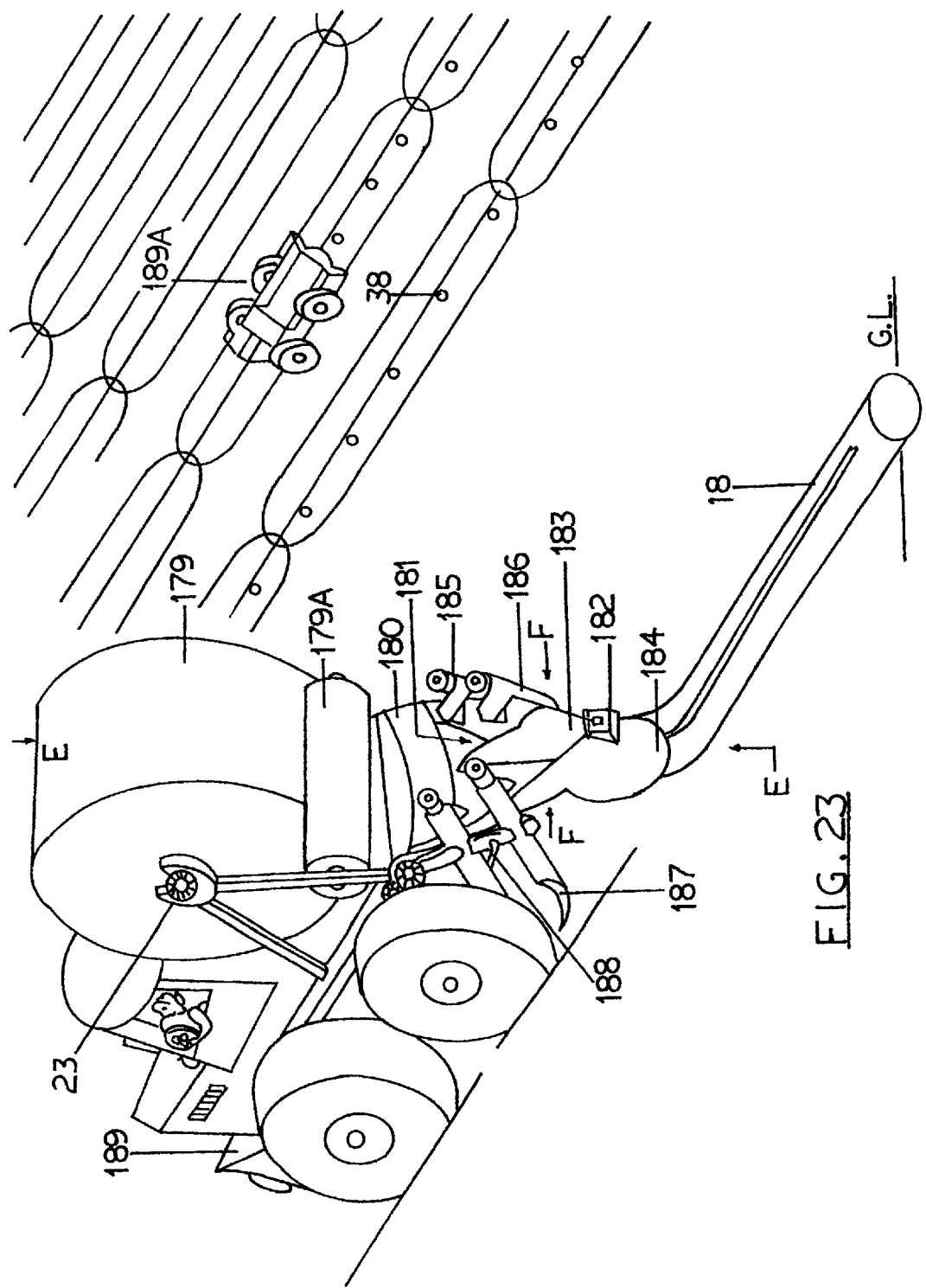

METHOD AND DEVICES FOR FORESTATION AND FLOOD PREVENTION

This application is a divisional application of U.S. patent application Ser. No. 09/729,283 filed May 12, 2002.

FIELD OF INVENTION

This invention relates to a forestation method and system for improving the global environment.

BACKGROUND OF THE INVENTION

People are increasingly aware of the changes in the global weather pattern from that of the past. Pollution of the environment is worsen with the annual ever increasing demands for more crude oil and the creation of industrial acid fluid wastes. People in Canada and other parts of North America are warned to stay out of the mid day sun in the summer to avoid being harm by the high level of UV ray passing through the hole in the ozone layer. Economists have long warned that the world economy is on a deteriorating track; nonetheless, in combating poverty and in seeking for affluence or better health care, changes must be made to restrict the source of pollution. This is evident by the diminishing amount of forest world wide. Some effort has been spent in re-forestation in which seedlings are carried in bags by people climbing up a mountain side to plant them; however, it takes many years for a tree to grow to maturity from a seedling. A land that is not protected by trees is subject to soil erosion. The eroded soil eventually ends in rivers to cause water blockages which in turn cause flooding; and flooding causes yet more soil erosion and more blockages in the river. Often, in flood, water would bypass hydro dams to seek for faster routes to flow out to the sea or lake, and it carries with it the soil and invariably the soil protective plant and grass, thus the water source is depleted in an even more faster rate. Thus, flood occurs more frequently and more seriously world wide. Drought may follow after a flood, because the land after the flood would lose its water retaining property due to leaching by the flood water. The leached soil is not suitable for plant growth either by natural means or by manual planting; and rain water, if any, subsequently falling on such soil would simply run off quickly to result in that the water levels in the lakes and rivers are abnormally low during the drought, or are overflowing by the excessive amount of water flowing into them swiftly during the flood. River and stream are the result of the accumulation of droplets of water from rain. Modern engineering may provide advanced techniques but it often lacks diligence. It tends to solve a defect by correcting the defect per se rather than curing its cause. The present invention provides the combination of plastic bags with the soil and sand world wide for preventing the soil erosion due to wind or flood. It provides a method of creating a soft or flexible brick which eliminates the deficiencies in the common use of steel reinforcement, concrete, rock, clay brick, and fire baked brick for such purposes. With the stabilization of the soil and sand that are not affected by flood or drought, vegetation planting can be effectively carried out. The vegetation would, in turn, improve the soil; and it would flourish with roots growing deeper into the soil as well as providing richer foliage to shading the ground so as to improve further its water retaining property. Due to the differences in the amount of rainfall, ground and soil formation, and factors in the working environment, the following various methods are provided by the present invention to achieve these purposes:

(1) Device with dripping water supply: In a windy area, a tent-like protective plastic shield or housing is firmly anchored on the ground with sand piles. The housing creates a rain forest environment within it while providing the air required for growing a tree in such a protected environment. After the tree has grown to maturity and is capable of withstanding the severe environment outside of the housing, the tree would inherently break the latter. The grown tree would subsequently provide shading and protection to the sand and soil it grows on.

(2) For dry land in a semi-desert area, seeds and tree seedlings are grown in deep trenches provided with necessary lighting. Thus, they are not affected by the wind and the hot baking sun on the ground surface, and the vegetation grows and flourishes in the humid and still air environment deep in the trenches. This method also inherently resolves the common problem of the inability to achieve deep root growth of the seedling in a desert area.

(3) Another method is placing healthy tree stocks or seedlings in a bullet or bomb or bullet head for planting. A helicopter is used for carrying out such rapid planting even in areas inaccessible by land means such as up on steep mountains, and areas inhabited by ferocious animals or poisonous creatures. With the present invention of the century of the unique planting method, forestation may be carried out in any area throughout the world.

The deterioration of the global weather is largely due to the negative effect of the ever increasing demands for advanced living standard by human. The global greenhouse effect has now already caused a variety of natural disasters to occur. This is mainly due to the build up of large amount of carbon dioxide gas created in the atmosphere, which causes the adverse changes in the global weather. Trees to absorb the carbon dioxide gas from the atmosphere. The present invention provides various forestation methods and systems which may be carried out to grow vegetation widely in any land.

SUMMARY OF THE INVENTION

1. The invention begins by studying and solving the most difficult problem in the forestation of the desert. The most difficult problem with the forestation of the desert is that there is no cohesion in the sand particles in the desert; for this reason, they are easily scattered by wind. Thus, it is difficult to cultivate vegetation in sand. An attempt has been made in the Middle East to spray a thin layer of crude oil on sand to increase its cohesion so as to facilitate vegetation cultivation; however, it has not been proven to be feasible. The present invention utilizes the abundant sand in the desert and vacuum filling it in bags formed by automation by continuously sealing two flexible plastic sheets together. The basic filling material includes a mixture of sand and soil, yellow soil, red soil, clay soil, and fine gravel etc. The basic material may be taken from the desert without requiring further effort in searching for any particular chemical ingredient, size, cohesion or retraction. It is not necessary to build a factory at the site or to use precious natural resources such as coal and mine in the process that may create pollution to the environment All that is necessary, is a farming cultivating machine or tractor for separating large size rocks from the finer sand and soil, a back hoe machine, and the formation of flexible plastic tubes or bags of various shapes and filling the bags with the sand mixture. The unique flexible bricks may be provided in various shapes and sizes depending on the functions required. For example, elongated flexible bricks of different sizes may be used for constructing barrier walls over a long distance in a desert. The flexible bricks may be fabricated in a continuous process on site with the fabricating machine driving behind the cultivator or tractor which disposes of unsuitable large size rocks along the path. The vacuum device on the fabricating machine extracts air from the flexible bricks while they are being formed so as to form a vacuum pack. The lifting device in the fabricating machine delivers the flexible bricks along the two sides of the path as well as piling them to a desired height to form barrier or retaining walls at the intended site. With the fabricating machine and the cultivator driving in such tandem manner, barrier walls such as wind barrier walls may be conveniently and quickly built anywhere in the desert. The method may also be used for installing dikes along a river such as the Yangsi River in China which is prone to flooding. The flexibility of the flexible brick of the present invention, facilitates flexible dikes to be built, which can migrate between the high tide and the low tide to maintain their flood prevention function. A barrier may also be built with such bricks across a river such as the Yellow River in China to form dams and lakes for saving water and separating the sediment from the water. No reinforcing steel or concrete foundation is required in building the walls and dikes with the present unique brick since it is desirable to have the flexibility characteristics. The brick is conducive for grass root growth and for use by farmers for growing vegetation, and it has the advantage that it may be installed freely and easily at any location, such as along the banks of a river or stream to prevent water erosion. Thus, the fabricating machine of the present invention may be used to build dams, flood dikes, islands in shallow beaches, or retaining walls along a sea shore. Leakage of sand and water from the bag is prevented by a plurality of "/ \" shaped flaps located in a reverse flow control venting port in the plastic bag. The flexible brick may be used to grow in it various types of vegetation. The sand in the bag is capable of retaining an amount of water equal to 30% of its own volume within the bag, accordingly, it is beneficial for the vegetation growth in such bricks since the amount of water retained in the bag in one rainfall is equivalent to five times the amount of water retained by the same amount of sand outside of the bag.

2. Another important method is growing vegetation within a tent-like housing or shield having a water supply control. The housing or shield is made of a plastic sheet painted with a sun light and heat reflection external coating. A wind operated device is provided for supplying fresh air within the housing. The plastic housing has a predetermined height to protect the vegetation or tree seedling to grow safely to such height. Eight telescopic support rods are located around the base of the plastic housing and are inserted to a desired depth into the sand to anchor the housing securely on the sandy ground. A completely sealed housing is thus erected on the ground and it is weighed down safely by the weight of the sand located within it. In turn, the sand within the housing is protected by the latter. Thus, a green house is provided by the housing for growing the seedling in a tropical rain forest like environment to a healthy tree. In the meantime, grass may also be grown around the tree to hold the sand particles firmly together. A cutting blade is located at the top of the housing which would sever the housing when the tree has grown to such height particularly when it is also swayed by the outside wind. The bottom of the housing would also be eventually destroyed by the roots of the growing tree. An air inlet is provided for supplying fresh air into the otherwise completely sealed housing. A ventilation opening is provided to save any water content in the moisture within the housing for the plant growth. A unique sun light operated water pump is provided to extract water from the ground through a tubing to supply the water required for the growing tree. The sand within the housing retains an amount of water equal to 30% its volume. A water storage tank is mounted at the middle of the outer side wall of the housing for supplying additional water to the interior of the housing. Leaf shaped collectors are provided for collecting rain water to the water tank. To safe guard against water shortage in a severe dry condition, a plurality of water balloons are located in the sand within the housing around the seedling. Each water balloon is provided with an automatic cutting blade on its surface. The cutting blade is automatically operated by a retractable tissue material such as cow tendon which reduces its size or length as the humidity of its surrounding decreases. Thus, the water balloons will be severed under hot dry spells which may occur up to several months without rainfall in the desert. Water balloons with cutting blades having the retractable tissue material of various lengths are provided such that they will be severed at different times in order that water from the different balloons will be used to provide the required emergency water supply over a long period in the hot dry spell. A plurality of water containers are placed on the closed bottom cover of the housing. The water level in the water containers is controlled by a floating cantilever arm which is similar to that used in the water tank of a conventional flush toilet. A plurality of openings are formed on the sides of the water containers such that the water may flow out from these openings into the interior of the housing. Water is supplied to the water containers by tubes from the water storage tank and the flow rate of the water is controlled by the floating cantilever arm. A plurality of cutting devices are located at the bottom cover. These cutting devices will be pushed by the roots of the tree when it has grown to maturity in about 10 years to break the bottom cover of the housing when it will no longer be required. A large plastic cloth having a diameter much larger the base of the housing is placed on the ground outside of the housing at the bottom of a circular trench dug in the sand surrounding the base of the housing. The trench is for collecting water from any annual heavy rain may normally fall in the desert. The water collected will eventually seep into the ground to feed the tree. This method may be employed in the most severe desert condition for growing vegetation.

3. In a semi-desert region which has a more moderate weather condition and some vegetation has already been grown in it, vegetation may be grown moderate weather condition by using the flexible bricks for preventing the sand from being blown away by wind. The interior of the housing is directly open to the outside atmosphere. A plurality of / \-shaped reverse air flow control venting ports are provided to control the humidity of the interior of the cylindrical shape housing which has a lower portion located in a deep trench formed in the sand. The seedling grows in the trench covered by the housing. Optical fibers extending from the top part of the housing above the ground to the lower part are provided to conduct sun light to the latter for the growing seedling. Water supply and water collection are provided in the manner as described in the previous embodiment. Since the housing of this embodiment is open to the outside atmosphere, it is not necessary to seal the housing or to provide additional fresh air supply as in the previous embodiment. A cap is provided at the top of the housing. The cap is rotatable by the outside wind to prevent sand from being blown into the housing. The water pump may be operated by the heat of the sun light as in the previous embodiment, or alternatively by a windmill. Two UV ray reflecting lenses are provided in the tubular housing to lower the heat caused by the noon day sun light. These lenses are painted with light reflecting patterns.

The above embodiment is particularly suitable for growing young seedlings which can otherwise only grow close to the ground surface. With this method, the seedling may grow close to the sand surface inside the trench within the tubular housing, such that by the time it has grown to the height of the outside ground surface, it would have a height of about 3 feet. The tubular housing may be made from water-proof paper or thin metal plate. Such material will automatically break down and disintegrate in about 2 to 3 years after being used in the humid soil environment which normally exists at the depth of 3 feet under the ground in any desert area. The cap is made by rolling a plastic sheet with glue applied at its joint. The plastic and the glue would also break down over time to separate from the grown tree, and eventually the trench would be filled again by wind blown sand. Therefore, it is not necessary to spend further effort in re-filling the trench with sand. Moreover, since the matured tree is deep rooted when grown with the present method, it would not be easily uprooted by the strong wind in the desert.

4. The following method is applicable in a region having annual rainfall more than the semi-desert area mentioned in (3) above the tubular housing may be made with a cardboard material. A plurality of leaf shaped plates are mounted on the side of the housing for collecting rain water or dew for growing the seedling in the housing. A sand cap is provided at the top of the housing. A circular opening is formed at the top of the sand cap. The circular opening has an inwardly and downwardly folded lip slanting at 45 degrees; and a plurality of thin metal foils or plates are provided on the lip by adhesive. Wind blowing at the housing would cause the sand cap to cover the housing more tightly. Furthermore, due to their slanted position, the metal foils or plates would reflect sun light into the housing to supplement the light provided by the optical fiber. Several water balloons are also located in the sand within the housing. A plurality of wall openings are formed in the lower portion of the side wall of the tubular cardboard housing which is located below ground so that the ground moisture of the surrounding sand and soil may enter the housing through these wall openings. The planting of the seedling in the trench in this embodiment may be carried out automatically with a cultivating machine.

5. Bullet planting: In this embodiment, the small seeds of large trees are placed in an embryonic sack which is installed in the head of bullets, in which the bullet head is made of a mixture of hard wood powder, fiber, fertilizer, water base glue and plant base plastic compacted together under high pressure. The plant seeds are located in a depression or cavity formed in the rear end of the bullet head and it is covered with a mixture of fertilizer and heat refractory material. Planting may be carried out by firing such bullets from a helicopter having a telescopic view of the planting area shown on a display screen so that the bullets may be accurately fired at every square foot of the planting area. The seed may be attached to the bullet head with an optical fiber. Therefore, after a deep bullet hole is formed on the ground by the bullet, the seed would automatically be dragged into the bullet hole by the optical fiber. The impact of the bullet on the ground would cause a small amount of the spout promoting fluid to be released from the mixture to enhance the seed growth; also sun light required for the seed growth is provided by the deployed optical fiber conducting sun light into the bullet hole. In this manner, the seed would grow in a favorable humid condition in the hole deep under the ground without being affected by the strong wind and hot sun on the ground surface. This method is particularly applicable in a more temperate region in which sufficient rainfall would provide the necessary water for the seed growth. After firing, the bullet shells or cartridges may be retained in the helicopter for further use. Furthermore, this method may be utilized for planting in any area even if it is inaccessible by ground means or regardless if it is up in a steep maintain, inhabited by ferocious animals or poisonous creatures, or deep in a river valley. The success growth rate of this method is very high. Several designs of this embodiment are shown below. They function in the same principle but are adapted in various regions having different amounts of rainfall and different soil conditions.

A small amount of water required for the initial growth of the seed is contained within a separately sealed water balloon which is also packed in the bullet head. The water balloon will be broken by the impact when the bullet hits the ground to provide the water required by the seed initially. The water balloon, the seed and the optical fiber are located in a depression or cavity located at the rear end of the bullet head and are protected by a heat-proof cover plate. The cover plate will be removed between the time in which the bullet leaves the gun barrel and prior to it hitting the ground, so as to release the optical fiber. An annular steel brush ring is located at the muzzle of the gun barrel and it is engageable with a channel formed in the bullet head for removing the protective cover plate so as to release the optical fiber from the bullet head. Several other methods to achieve the same result will be shown below.

6. Tree planting ball: this embodiment enables planting to be carried out inexpensively and automatically. In a dry and hot region, seeds may be planted deeply in trenches in the land having the top layer of its soil initially removed so that the seed may grow in a moist condition deep in the soil. A cultivating machine equipped with a drill is used both for forming planting holes in the soil as well as placing sealed balls containing seeds or pre-dressed seedlings into the holes. Water balloons and plant nutrient fluid are also included inside the balls The seed is located in an embryonic sack located within each ball. One end of an elongated optical fiber is connected to this embryonic sack and the free end of the optical fiber extends outside of the ball to wind around a channel formed on the outside surface of the ball. When the ball rolls into the planting hole, the rolling motion would cause the optical fiber to unwind from the channel with its upper end held in place by a spring clamp such that the ball is hung within the planting hole by the unwound optical fiber which subsequently conducts the sun light from above ground to the seed in the embryonic sack. The lower end of the optical fiber is also connected to a knife which would sever the water balloon. The ball is similar to an egg for incubating the seed growth. Air is supplied to the interior of the ball through a top opening. The optical fiber also extends outside of the ball through this top opening. The upper and lower halves of the ball shell are made of a mixture of fertilizer and a water soluble substance or glue or gluten and plant fibers compacted together to form a thin half shell. After more than ten days, the upper half shell of the ball will disintegrate and separate from the lower half shell. Some of the water from the severed water balloons would remain in the lower half shell for the seed growth.

BRIEF DESCRIPTION OF THE DRAWINGS

FIG. 5A is a schematic diagram illustrating the two banks of a river with two curved lines which varies their positions from low tide to high tide.

FIG. 5B is an isolated perspective view of the soft bricks according to the present invention having water collection holes formed therein such that the bricks may be used for growing ground vegetation.

FIG. 5C is an isolated perspective view of the laying of the soft bricks for building a water dam or water canal.

FIG. 5D is a perspective elevation view of the soft brick for building a retaining wall on a river bank.

FIG. 5E is an enlarged view of the reverse leakage preventing means of FIG. 5D.

FIGS. 6A and 6B are enlarged perspective views of the knives located at the top and at the base respectively of the housing.

FIG. 8 is an isolated enlarged elevation view of the automatic shut off valve for the housing shown in FIG. 6.

FIG. 9 is an isolated enlarged partial sectional elevation view of the water pump located in the housing of FIG. 6.

FIG. 10 is an isolated enlarged partial sectional elevation view of an alternate embodiment of the water pump.

FIG. 11 is an enlarged isolated elevation view of the automatic air vent control of the housing of FIG. 6.

FIG. 12 is an isolated enlarged perspective elevation view of the air exhaust of the housing.

FIG. 18B is a sectional elevation view along section line H—H in FIG. 18.

FIG. 19A is a sectional side elevation view of the live saving water balloon for providing water to the vegetation in the housing.

FIG. 20 is a sectional side elevation view of the embryonic sack for planting in a ground hole according to the present invention.

FIG. 21 is a side elevation view of the steel wire brush installed adjacent to the planting gun muzzle.

FIG. 22 is a perspective side elevation view of the fabricating machine for making the flexible soft brick according to the present invention.

FIG. 23 is a perspective elevation view of the desert improving bag production vehicle according to the present invention.

DETAILED DESCRIPTION OF THE PREFERRED EMBODIMENTS

Figure 1:
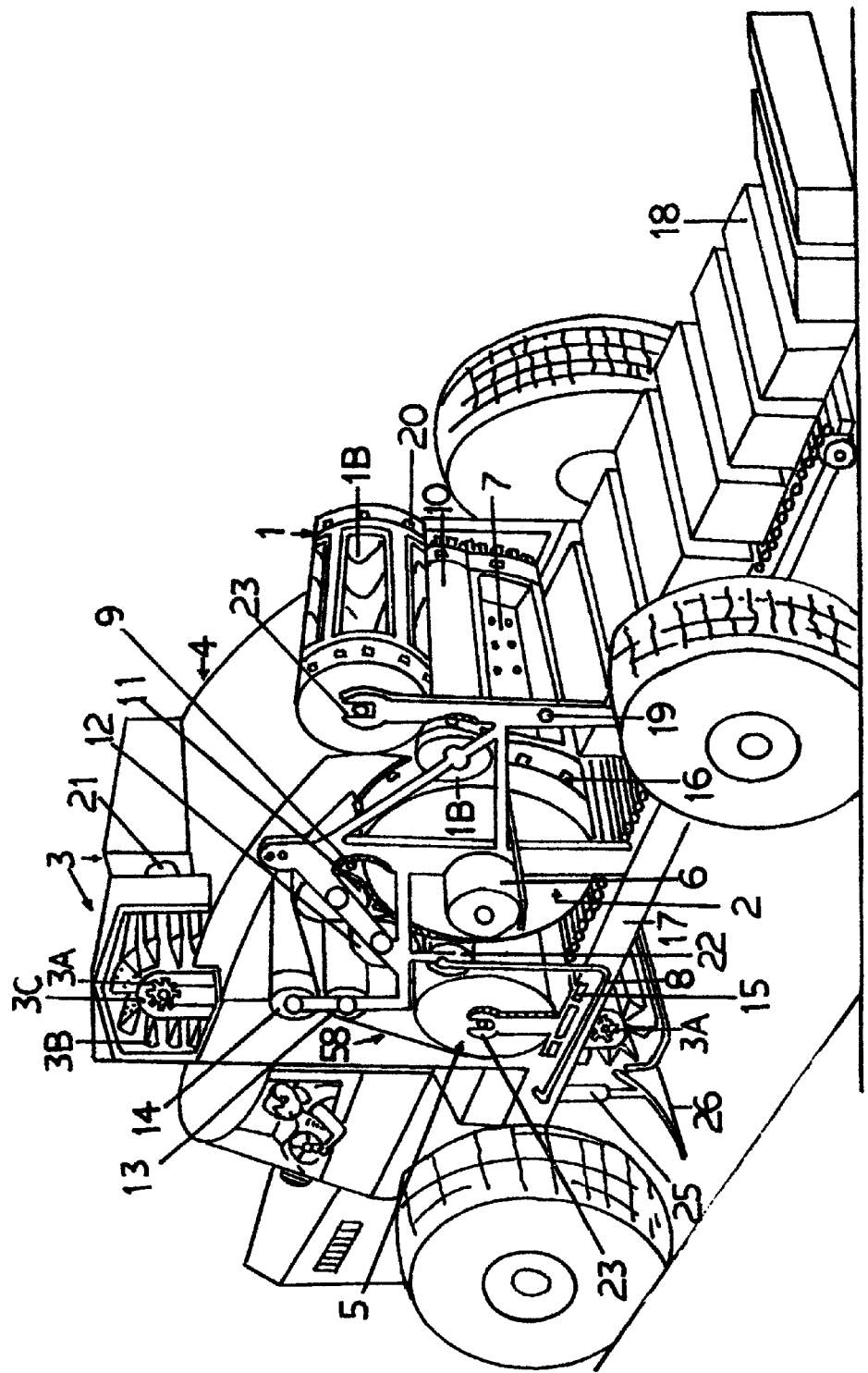
FIG. 1 is a perspective side elevation view of the flexible brick fabricating machine according to the present invention.

The flexible brick fabricating machine of the present invention has a rotatable round tub provided with a steel mold 2. The mold is rotated with various gear drives which are rotated by an electric motor 6 to roll out a round shaped plastic wrapping by simultaneously drawing two continuous plastic sheets in which one sheet is drawn from a right supply reel 1 and the second one is drawn from a left supply reel 5, towards the center of the mold 2. The plastic sheet from the supply reel 1 has the required form and is adapted to engage within a steel channel 7 in the mold. Holes are formed on both side edges 16 and 20 in the plastic sheet to engage with teeth on the mold for driving the sheet through the machine: A hopper 4 of the filling station is located at the top of the mold 2 for filling the wrapping sheet with sand. The sand is obtained by a scoop 26 which retrieves the sand from the ground and delivers it to the filling station by an elevator 3. After the lower half of the plastic wrapping sheet 1B is filled and packed with sand, the upper wrapping sheet 5B is placed over it and heat sealed to it to form the bag. Then air is extracted from the bag so as to form the flexible soft brick. In this manner, flexible soft bricks are formed continuously and then laid subsequently over the desert surface to protect the sand, or to build a retaining wall, or for growing vegetation in them, or for building dams for collecting rain water etc. The system may also be used to fabricate the flexible soft bricks without performing the laying operation at the same time. It may also be set up in a factory for producing such flexible soft bricks at a fixed location.

An elevator 3 delivers the sand to the filling station. It consists of a drive gear 3A for rotating a rubber drive belt 3C having a plurality of sand buckets mounted on it for transporting the sand to the filling station. The rubber drive belt 3C has grooves formed in its inside surface adapted to engage with the teeth on the drive gear. The sand buckets are mounted on its outer side. The sand filling hopper 4 has a bottom end covering closely over the steel mold 2. Sand is delivered to it by the elevator 3.

A steel mold 7 is provided for forming the brick. A plurality of mold receptacles are formed in the mold for forming and carrying the soft bricks having a plurality of openings. A vacuum device 8 operates to extract air from the bricks.

Depressions 9 are formed on the cylindrical drums, which are operative to engage with the teeth 16 of the steel mold 2. A drive cylinder 10 operates with the steel mold 2 for moving the plastic sheet 1B over the steel mold 2 with the openings formed in the two side edges of the plastic sheet 1B. A similar drive cylinder 11 is used for moving the plastic sheet 5B to the steel mold 2. A heat roller is used for heat sealing the plastic wrapping 1B and top cover plastic wrapping 5B together. Two heated rings are provided at the two edges of this roller. The actuation of these heat rings is controlled by a horizontal rod. The length of the perimeter of this roller is equal to the shorter length of the flexible soft brick so that when it has rotated for one revolution by the drive cylinder 11, it would have completed the sealing operation for one flexible soft brick formed in the steel mold 2. Pressure rollers 13 are provided for transporting the top cover plastic wrapping 5B from the supply reel 5 to the steel mold 2. Associated pressure rollers 14 have construction and function similar to that of the pressure rollers 13. The supply reel 5 for the plastic wrapping is mounted on a support 15 which may be removed for changing this supply reel. Teeth 16 are formed on the steel mold. They engage with the openings 20 formed on the two side edges of the plastic wrapping.

The fabricating machine has a chassis 17, and rollers 17A are provided for transporting the finished fabricated flexible soft brick 18. A video monitor camera having a lens 19 is operative for monitoring the laying operation of the flexible soft bricks. The elevator 3 is coupled to a reversible electric motor 21 through a rotary shaft. A drum 22 extracts air to form vacuum in the brick as well as for heat sealing the plastic wrappings of the brick.

A brake 23 is operative to stop the supply reels 1 and 5 from rolling by inertia when the machine is shut off. The machine has a vertical frame 24. A pneumatic cylinder 25 is used for lowering or raising the sand scoop 26 for retrieving sand which has been loosened by the cultivator moving in front of the fabricating machine and it delivers the sand to the buckets 3B in the elevator 3.

Figure 2:
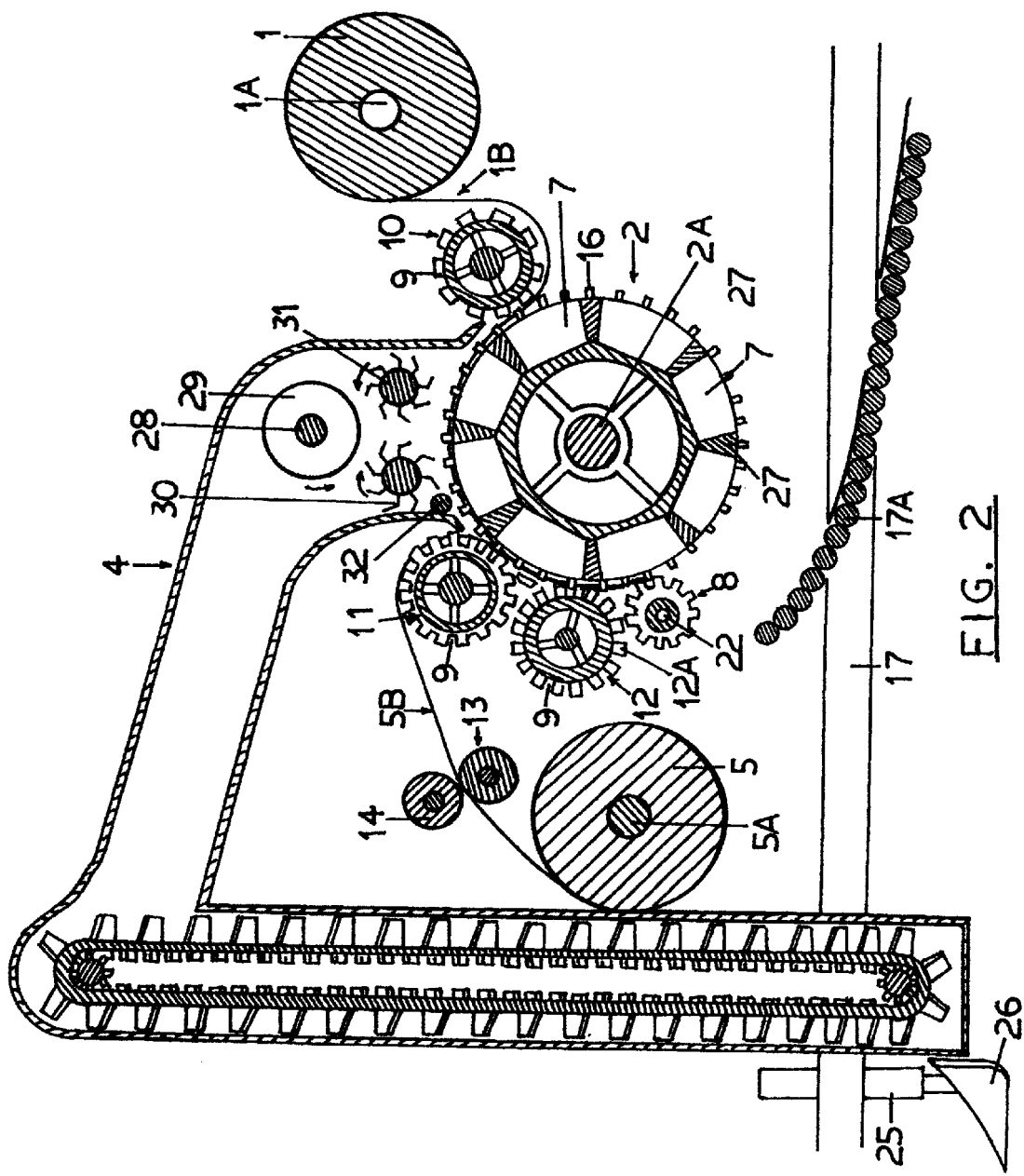
FIG. 2 is an isolated sectional side elevation view brick fabricating components of the fabricating machine of FIG. 1.

As shown in FIG. 2, a vibrator 27 operates to compact the sand in the brick during fabrication. A plurality of rotatable steel knives 28 are provided in the steel drum 29 for loosening the sand. A plurality of fins 30 are formed on a rotary shaft 31 for directing the sand into the mold 7. A plastic coated rotating shaft 32 cleans sand off the top and bottom surfaces of the plastic wrapping sheet prior to the heat seal operation.

Figure 3:
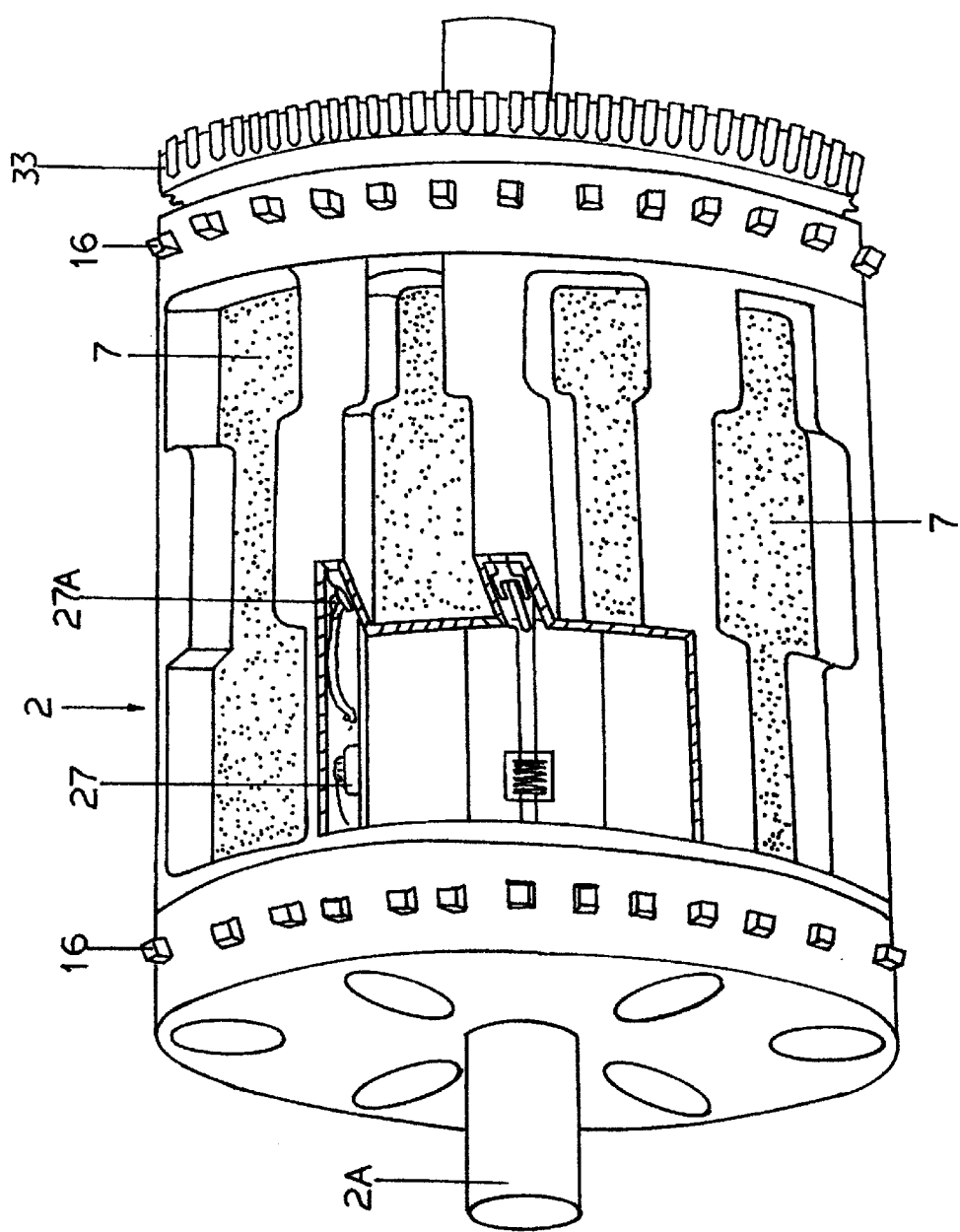
FIG. 3 is an isolated enlarged elevation view of the rotatable steel mold of the fabricating machine.

As shown in FIG. 3 the rotatable steel mold 2 includes a teethed drive wheel 33 for rotating the cylinders 25 and the various wheels.

Figure 4:
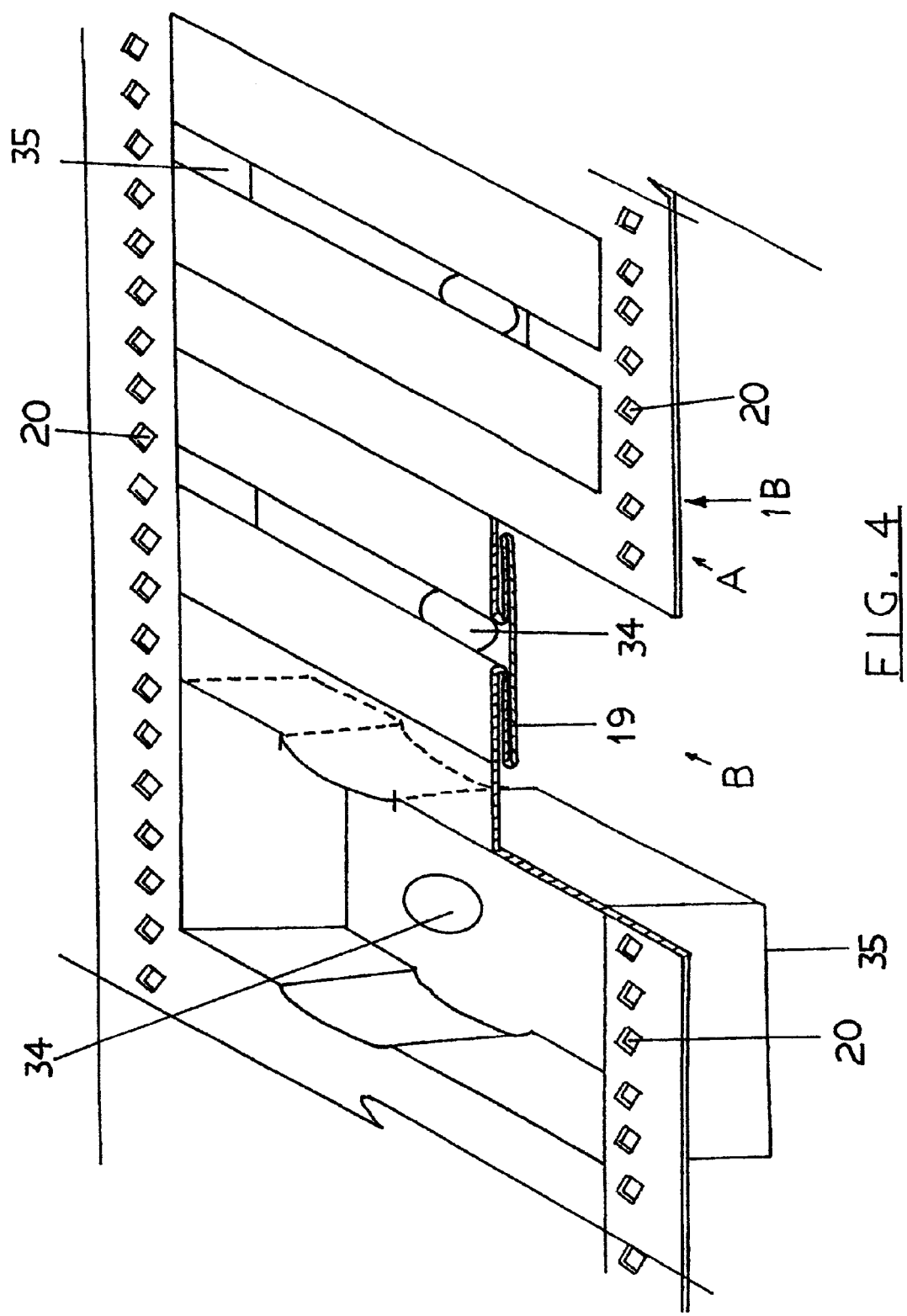
FIG. 4 is an isolated enlarged elevation view of the plastic wrapping belt and the sand wrapping mold forming a composite belt.

As shown in FIG. 4 the plastic wrapping sheet 1B and the sand wrapping mold forming a composite belt in which the portion "A" shows it in a folded flat condition and the portion "B" shows a cut view in its middle section and the portion "C" shows it having been placed within the steel mold. A protruded bubble 34 is formed at the base of the composite belt. The bubble is variable to supplement the volume of the sand in the soft brick when the brick is subjected to pressure when a number of bricks are stacked together. The bag of the brick has a bottom surface 35.

Figure 5:
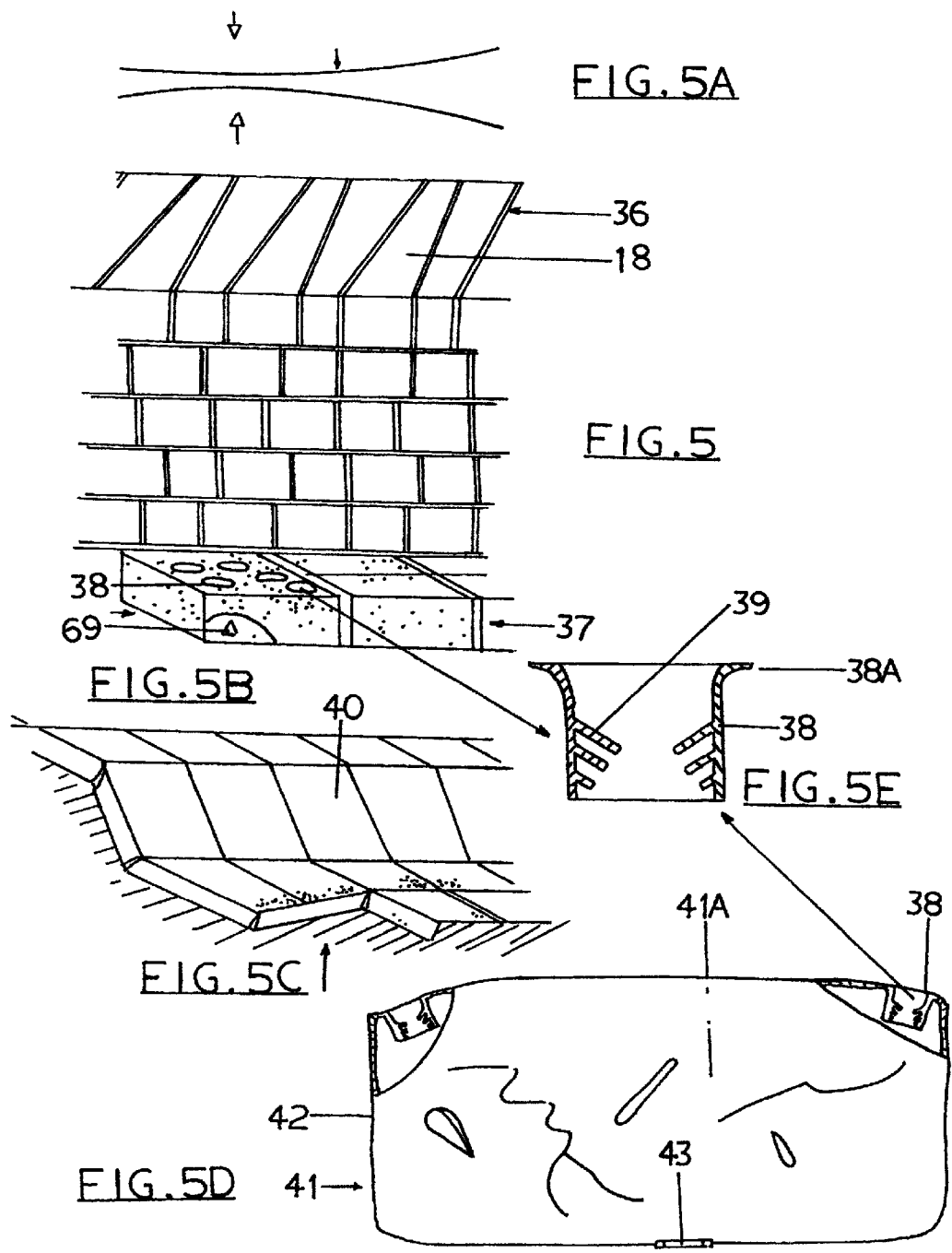
FIG. 5 shows the use of the soft bricks according to the present invention for building a retaining wall or river bank protecting dykes.

As shown in FIG. 5 the soft bricks may be used for building a retaining wall, river bank protecting dykes etc., which can advantageously vary their location or formation to accommodate changes for low tide and high tide. FIG. 5A illustrates the two banks of the river with two curved lines due to changes of low tide and high tide. As shown in FIG. 5B the soft brick having water collection holes may be laid on the ground in a desert for growing ground vegetation. Reverse leakage preventing means having a / \ shape are provided in the holes to admit rain water into the brick, so that in addition to the 30% water retaining characteristics of the sand together with the rain water collected in the brick through the holes having the reverse leakage preventing means 38 (see FIG. 5E), the amount of water retained by such construction in one rainfall is equal to that of five rainfalls. The bricks are laid on the desert ground to cover and stabilize the desert sand, and seeds may be placed in the bricks through the holes to grow ground vegetation. Knives 69 are provided at the bottom of the bricks. FIG. 5C illustrates the use of the soft bricks for building a water dam or water canal. As shown in FIG. 5D the soft brick may be used to build a retaining wall on the river bank to prevent soil erosion and to increase the soil's water retaining property. Wood chips, short iron wires etc., may be added to the soil and sand in the bag to increase its water retaining property. Similarly, a wind barrier 36 may be erected with the soft bricks along a windy desert road to reduce the speed of the cross wind.

The soft bricks may be laid on the desert surface 37 to stabilize the sand for growing ground vegetation and openings 38 are formed in the brick, which is provided with a "/ \" shaped leak preventing means 39 having various large, medium and small sizes to prevent water loss due to evaporation from the bag. The thin soft bricks may have a rectangular shape 40 with a plastic wrapping 42 and water saving opening 43.

Figure 6:
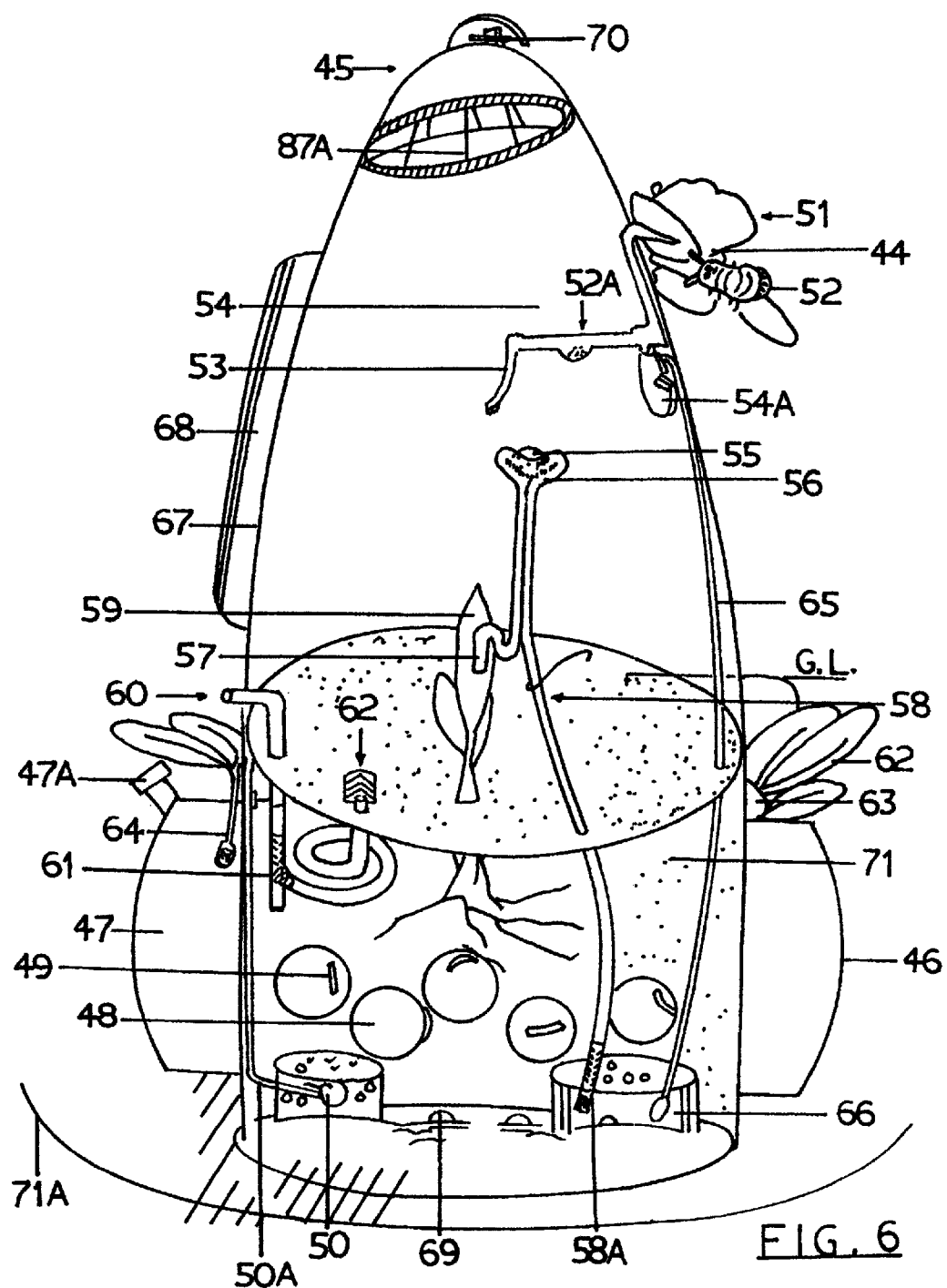
FIG. 6 is a partially cut side elevation view of the housing for growing a tree in the desert according to the present invention.

A housing 45 for growing a tree in the desert is best shown in FIG. 6. The housing 45 is formed by a plastic tent-like housing built with a sheet material or a membrane 67 supported by a frame 45A. It has breathing means 51 and 45, and a regulator to control the length and rate of breathing. It is also provided with heat preventing means 54 which regulates the interior environment as it is subjected to the outside heat for feeding the tree with water. A water storage tank stores rain water for use when the interior requires more humidity. The supply of water is automatically controlled by valves 47 and 50. Means 70 and 69 are provided to separate the tree from the protective housing after the tree has grown to maturity. Life saving water balloons 48 and 49 are provided to safeguard the tree's water need in the event of a long hot dry spell in the weather. There is no electric control or electronically produced material. A multitude of trees may be grown in the desert by this method. Moreover, even better results may be obtained by incorporating this method with the formation of trenches in the ground and the removable top covering cap as shown in FIG. 13A.

One third of the sand in the housing is buried below the outside ground surface in order to anchor the housing firmly against the wind. Eight support rods are inserted into the ground and located evenly around the inside of the housing in order to maintain the housing in an upstanding erected manner. A water storage tank 46 is mounted to the housing and resting on the outside sandy ground surface for storing an amount of water 47. Additionally water-filled balloons 48 are located in the housing, which would break open automatically in the event of an emergency of a long dry spell to provide the water necessary for feeding the tree. The breaking of the balloons 48 is provided by a tissue material 49 made of cow tendon connected to a cutting blade and adhered on the water balloon. Its length is affected by humidity to operate the cutting blade to cut open the water balloon in an emergency dry condition. A small tubing 50 controlled by a floatation valve similar to that in a toilet water tank is provided to conduct water from a water storage within the housing interior 54. A breathing design 51 for drawing air into the housing is provided. It has a clamp 44 made of a hard plate material. The clamp is biassed by a rubber band such that it would open when it is blown by wind and the rubber band would close it after the wind has passed and a sand blocker 52 is provided at the venting port. An automatic control regulates the amount of air flowing into the housing. A movable cover 53 is located at the venting port. A water filled expandable bag 54A acts as the venting port door. The bag will be expanded by water vapour formed inside when its water is heated by the sun thus closing the venting port to prevent moisture in the housing from escaping to the outside. An additional watering means for the seedling 59 within the housing consists of a magnifying glass having two outwardly curved surfaces located at the top end of a plastic capillary tube 56 which is connected to a vapor absorption tube 57. A tie 58 is used for mounting the capillary tube in place. The housing has an air exhaust with an external filter cap 60. A ball of wire mass 61 is located within the copper pipe of the air exhaust, which is operative to condense the water moisture in the exhaust air. The water is returned to the sand in the housing through a lower tube. Also, plastic leaf shaped collectors 62 are mounted on the outside surface of the housing for collecting rain water to a collecting pool 63. Water flows from the pool to the water storage tank 47 through a small water tube 64. A capillary tube 65 is provided for replenishing a water can 66 located in the sand 71 at the bottom of the housing. A water valve is provided at its lower end of the capillary tube 65. Holes are formed in the water can 66 for releasing water into the sand within the housing. Supporting rods 67A are provided for maintaining the housing in an upstanding erected condition; and a door cover plate 68 is used to cover the door opening of the housing after the seedling is planted within the housing. Mating grooves and ridges are formed in the cover plate and the housing to hold the cover plate in place and adhesive may also be used to secure it permanently in place.

Furthermore, cutting knives 69 are mounted at the base of the housing. These knives 69 will be pushed by the roots of the tree after it has grown to maturity to sever the base of the housing. The knife blade is made of a degradable material. Another cutting knife 70 is located at the top of the housing, which has both upper and lower cutting blades. The knife 70 will be pushed by the tree when the latter has grown to the height of the housing to automatically cut open the top of the housing. The operation is also enhanced by the swaying motion of the housing when it is blown by wind. After the housing is cut, it is subject to wind rushing inside as well as the expanding force exerted on it from the inside by the supporting rods, thus it would readily break and disintegrate. A large plastic sheet 71A may be placed in a trench formed in the ground around the base of the housing such that rain water from any heavy rain will be collected in the trench without draining away to form an underground water pool. Such heavy rain may occur rarely once in many years to provide water for feeding the tree roots. This arrangement allows precious rain water to be saved for use in a desert.

Figure 7:
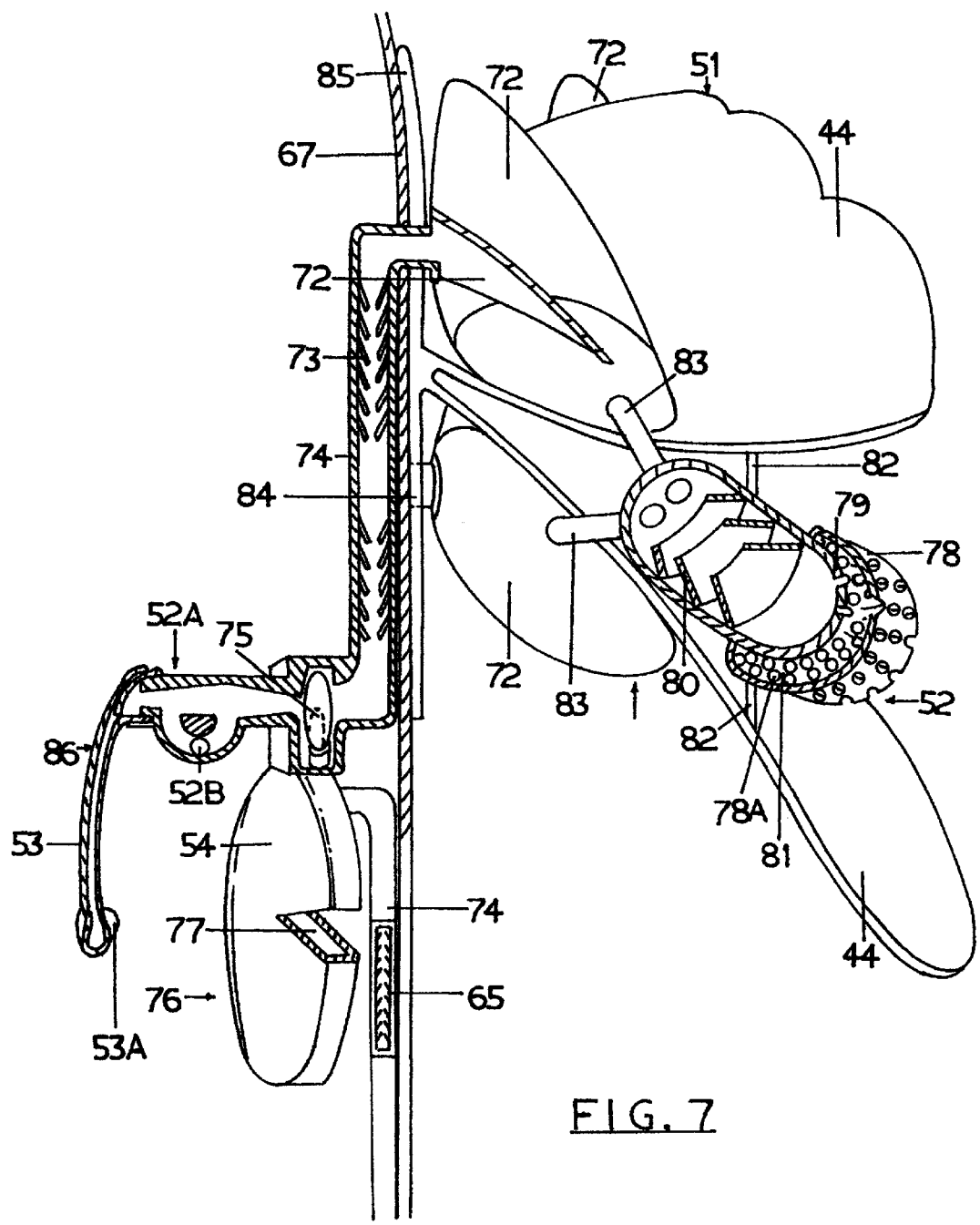
FIG. 7 is an isolated enlarged elevation view of the lung of the housing shown in FIG. 6.

FIG. 7 shows the detail construction of the breathing design 51 which functions as the lung of the housing. There are two lungs provided in the housing. Lung (a) consists of the changing air volume in the housing and the operation of the air vent port which operates in response to outside strong wind. Lung (b) as shown in this illustration, operates in response to light wind outside. This latter lung consists of three components, namely, a pair of flapping wing 44 which will be spread apart by the wind, and are pulled to close together by a rubber band 82 when wind is absent. It also includes an expandable rubber bag 72, and a reverse flow preventing fresh air inlet port 80. The action of the opening and closing of the flapping wings causes the expandable plastic bag 72 to expand and contract correspondingly. A plurality of fine hair 73 are positioned in a downward direction in a capillary tube 74. Also an air balloon 75 is mounted to and in communication with the water filled expandable bag 72 and it is located in the air inlet valve. It is expanded by the vapor derived from evaporation of the water in the water filled bag 72 when the water is heated by the sun. The expanded air balloon 75 blocks the air inlet to prevent hot air from entering the housing in such hot outside condition: A water filled bag 76 operates in association with the housing interior 54, the capillary tube 74, the air balloon 75, and the water 77 in the water filled bag for closing the air inlet when the outside is under a hot sun condition. Other fluids which can be evaporated by the sun's heat may also be used in the water filled bag 76. An outer cap 78 is provided at the air inlet port. The cap 78 has a plurality of openings 78A. The inner side wall 79 of the air inlet port has a plurality of hair 81 positioned in a "/ \" shaped manner to prevent the reverse flow of air through the air inlet port. Furthermore, the hair 81 is located in the shell 89 for automatically cleaning sand off the outer shell of the air inlet port. The rubber band 82 operates for returning the wings back to the open position when wind is absent. Left and right air bags 83 are connected to the capillary air tubes for drawing air into the housing. An air inlet tube 84 is located at the rear of the air bag. An elongated small air balloon valve 85 is provided, which expand under the pressure of the incoming air to allow the air to enter into the housing. A weight 53A is located at the lower end of the air inlet tube 84 to maintain the valve closed normally. Other valve construction may be used to provide the same function. The housing has an air inlet valve 86 and an automatic stop valve 52A which is located in the air valve 86 and operates to regulate the amount of incoming air to prevent a large amount of air that may harmfully flow through the air valve into the housing. A steel ball valve 52A is located within the air valve. The steel ball would be drawn to the position to block the air valve in the event a large amount of air is attempted to flow into the housing due to the sudden change in the interior air volume in the housing. A weight 53A is located at the end of the air valve.

As shown in the isolated enlarged sectional elevation view FIG. 8, the automatic control valve includes an automatic shut off valve located in the air inlet valve to prevent excessive air from entering the housing when the wind outside is very strong.

The water pump operated by the sun's heat is shown in FIG. 9. The pump is in the form of a capillary tube 56 having an upper portion heated by the sun such that the heat differential creates the pumping pressure to draw water upwards through the tube 56. A condensation lens 55 enhances the effectiveness of directing the sun's heat on the capillary tube 56. A back flow valve 58A is provide at the lower end of the capillary tube 56, and a V-shaped water trap 57 is provided adjacent to the outlet of the pump. A transparent cap 88 covers over the light condensing lens 55 to avoid dust and sand from settling on the lens.

An alternative embodiment of the water pump is best shown in FIG. 10 in which an elastic olive-shaped hollow ball 89 having an interior cavity 90, is operated by wind force to produce the water pumping action in the capillary tube 56. A tube 91 connects between the elastic ball 89 to the capillary tube 56. A V-shaped water trap 57 is provided adjacent to the outlet of the pump and a back flow valve is provided also at the lower end of the capillary tube 56. Resilient steel wires 92 are located at the pump for mounting and supporting the elastic hollow ball 89 to the capillary tube 56 such that the ball may be compressed by wind to vary its volume resiliently, expanding and contracting alternatively, to provide the pumping force.

The automatic air vent control valve 54 is shown in FIG. 11. The valve 54 is operated by the sun's heat to regulate the amount of air to be drawn into the housing according to the humidity in the housing interior. It operates to admit air into the housing in the morning and night times. It is provided with a top cover 93 over an evaporation dish located in the control valve.

The air exhaust 98 as shown in FIG. 12 includes a water recovering design for extracting any water content in the exhaust air. The moisture evaporating from the surface of the sand within the housing would cause the lowering of the temperature in the sand below. A portion of the exhaust in the form of a copper tubing 94 which is buried in the sand to utilize the lower temperature in the sand within the housing to recover the water content in the exhaust air. A paper filter 95 is provided at the inlet 99 of the exhaust and a mass of fine copper shreds 96 or wires is located in the copper tubing to enhance the cooling and condensation of the water content in the exhaust air. The paper filter cap 95 also acts to absorb some of the water content in the exhausting air and the moisture is subsequently returned to the housing by evaporation. An outlet cap 97 prevents sand from being blown into the exhaust. It also includes a back flow valve to prevent the outside air from entering the housing through the exhaust.

The knives 101 and 105 located at the top and at the base of the housing respectively are shown in FIGS. 6A and 6B. They will be operated automatically by the tree to cut open the housing when the tree has grown to maturity. Each knife 101 is attached to the plastic membrane or sheet by a round plate 100 having a plastic mounting base 102. The knife blade 105 is made of paper cardboard or similar degradable material. Wire loops 104 are provided on the knife base of the bottom knives 105 which will be pulled by the tree roots to cut the base of the housing.

Figure 13:
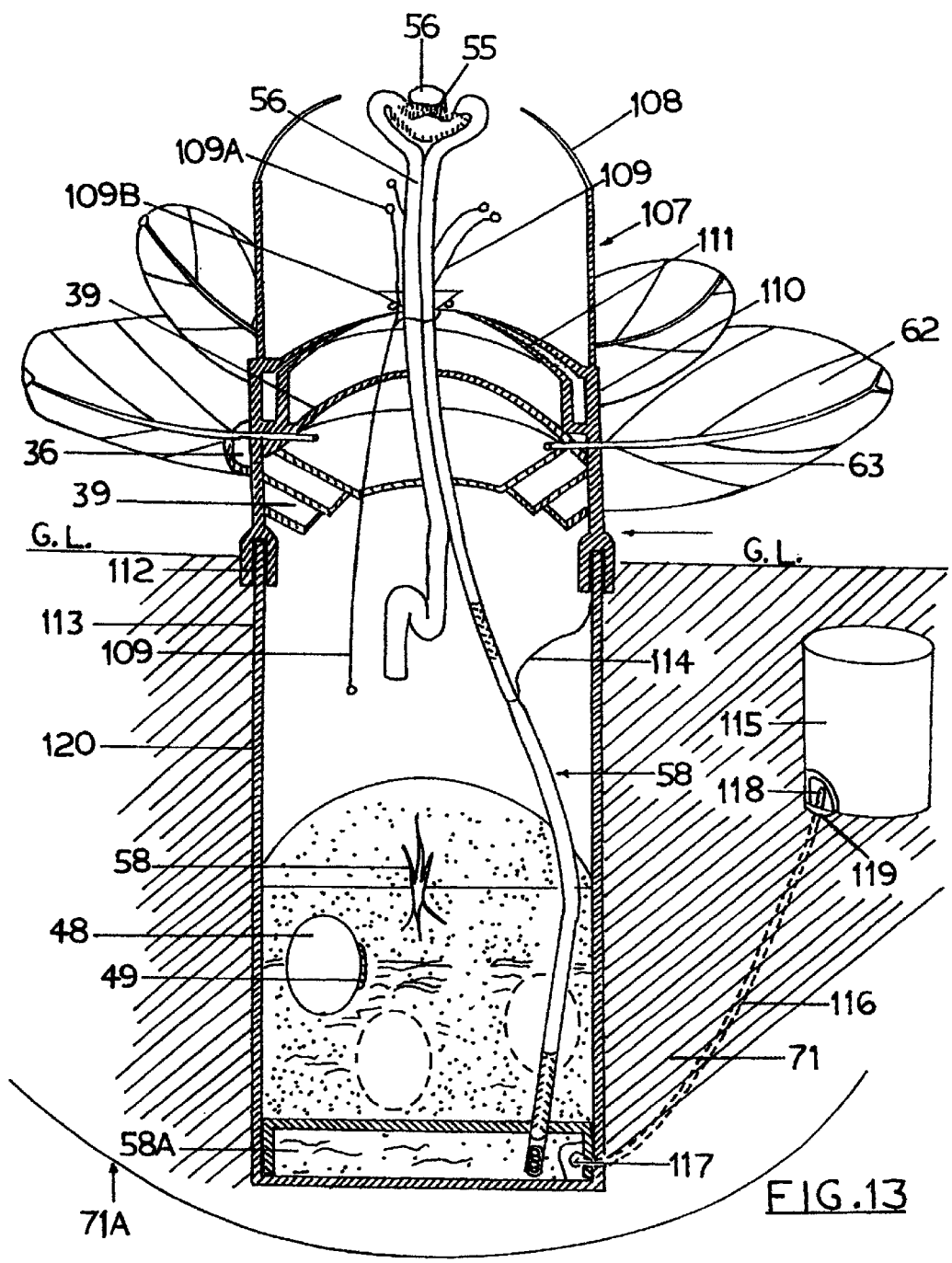
FIG. 13 is a sectional side elevation view of the embodiment of locating a protective housing partially buried in a trench for growing vegetation in the desert according to the present invention.
Figure 13A:
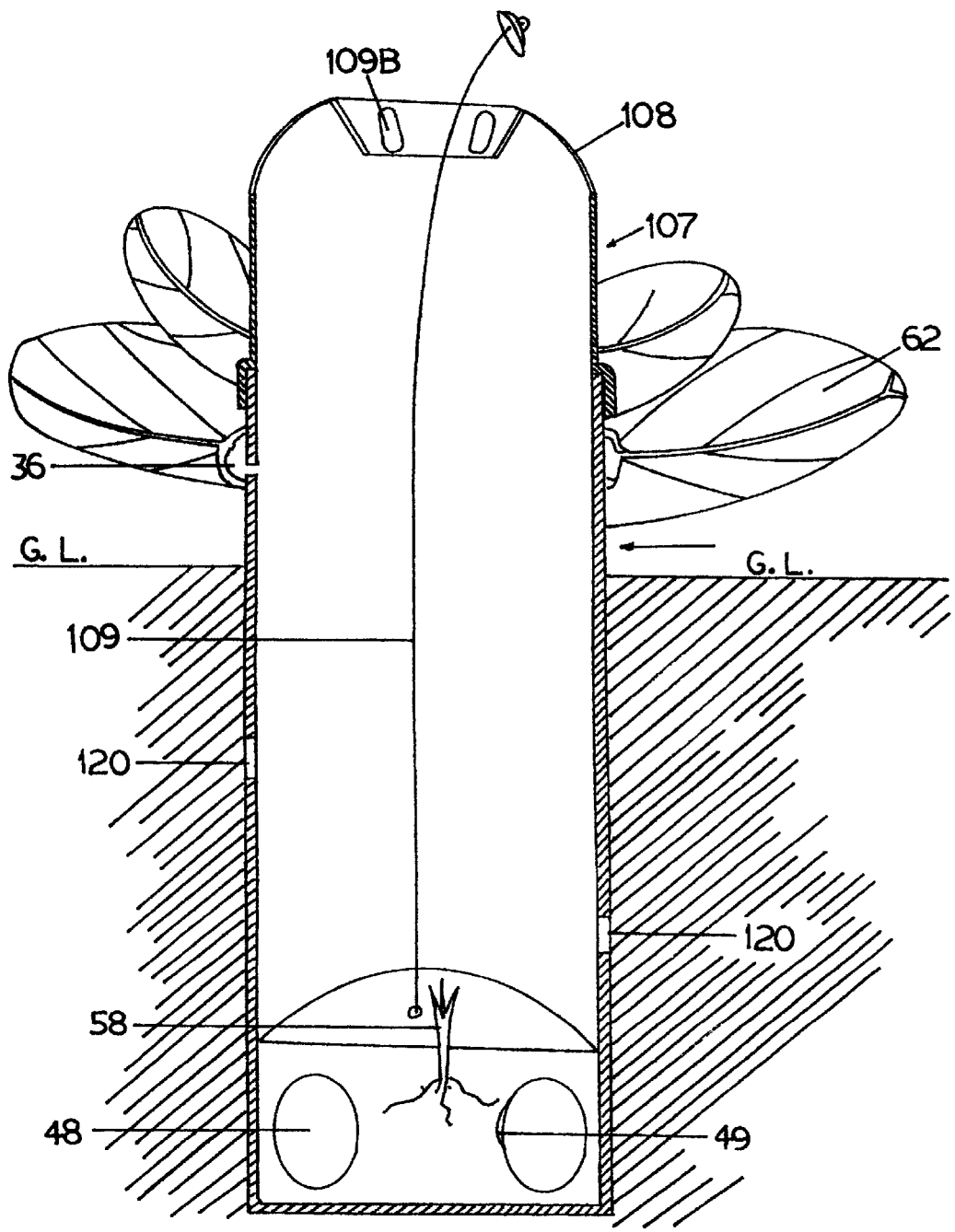
FIG. 13A is a sectional side elevation view of the embodiment of a housing for planting vegetation in a dry region having a more favorable condition than a desert.

Another embodiment in which a lower portion of the protective housing is partially buried in a trench for growing vegetation in the desert is shown in FIG. 13. This method is applicable in a semi-desert region or in a desert region in which the sandy ground has already been treated and stabilized with the laying flexible soft bricks on its surface. Seedlings or seeds may be planted in the cool and moist environment in a trench. Optical fiber is used to conduct sun light into the trench and additional light is also provided by thin reflective metal plates mounted on a cap located at the top of the housing. A water pump, operated by a light condensing lens as shown in FIG. 9 or a wind operated elastic ball as shown in FIG. 10, draws water from the bottom of the housing to spray water on the seedling. Air is supplied to the housing through a partially opened top cover 107. A draft cover made of a soft plastic sheet material 108 is placed on top of the top cover, which is carried by any down draft of wind to cover the housing so as to prevent wind carried sand from entering the housing. The draft cover would return to an upright opened position when there is no wind. A plastic lens, having flower petal patterns 111 and 110, is provided to block the UV ray of the sun so as to reduce water evaporation within the housing. Reverse pointing ducts 39 are provided to separate the regulation between the interior and exterior of the trench. The portion of the housing located below ground, in the trench, is made of thin metal plate, which will disintegrate automatically after several years and will be naturally absorbed into the soil. The ducts 39 are made by rolling flat pieces of soft plastic sheets into the cylindrical shape with adhesive applied at the joint. The adhesive will break down in time to cause the disintegration of the ducts, at which time the tree has already grown to maturity. Life saving water balloons 48 and 49 as well as water cans 115 are located in the sand to save water and to supply water for feeding the plant in a manner similar to that in the embodiment shown in FIG. 6. Only in this embodiment, rain water collected by the leaf shaped collectors flows directly into the housing. With the above design, the seedling would grow in the deep moist soil to a tree of nearly 3 feet tall having a strong root foundation and extending above the top of the trench. The blowing sand would eventually fill the trench :back with sand similar to as if the tree were planted manually at the location of the trench. The result of using this method is far better than attempting to grow the plant on the surface of the dry soil which is readily subject to erosion. The soft plastic top cover 107 can vary its shape according to outside wind pressure and it can recover to its original erected shape when the pressure is absent. Light is conducted into the trench from above ground by optical fiber 109 having a light receiving head 109A which is dust protected. Water 110 is contained in a cavity in the top cover 107 and vapor is created when the water 110 is heated by the sun to provide the moisture for maintaining the flower petal shaped plastic lens 111 in a spread out condition. In the cool morning and night times the plastic lens 111 would curl up. A circular joint ring 112 is formed between the different materials of the housing and the top cap. The circular joint ring 112 is buried in the ground and is made of water-proof cardboard material which would disintegrate in two to three years. Alternatively it may be made with a thin metal plate. The caps at the duct 39, the wind barrier 36, and the plastic lens 111 are made of plastic sheets similar to plastic sheet 108 rolled into a cylindrical shape with adhesive applied at the joint. The adhesive will also break down in time to cause the cap to break into disintegrated plastic pieces which are dispersed by wind to spread far away from the tree. The lower portion 113 of the housing is made of a metal plate, that is not plated with tin or rust proof, which can rust and disintegrate. It may also be made of paper having a plastic coating. The capillary tube 58 is mounted in place by a mounting means 114. A water tank 117 which may contain up to 5 gallons of water 115 is buried in the ground neighboring to the housing as shown in FIG. 13. A needle head 116 may be inserted through the rubber plug located at the side of the water tank to remove water from the tank. A water inlet opening 120 may be formed in the side wall of the housing below ground. The opening 120 drains excessive water, collected in the housing due to heavy rainfall, into the surround ground and it also normally allows the moisture from the surrounding ground to enter into the soil in the housing. A plastic sheet 121 may be located in the ground under the tree to form a saucer shaped water shield pool such that water may be collected in the pool for long time use. The sheet may have a diameter of several kilometers.

Another embodiment for planting in a region having better weather condition than that in the embodiment shown in FIG. 13 above is shown in FIG. 13A. It is a sectional side elevation view of the embodiment for planting trees in a region having frequent dry periods. It has metal foils 109B adhered on a swaying cap for reflecting light above ground into the trench.

Figure 14:
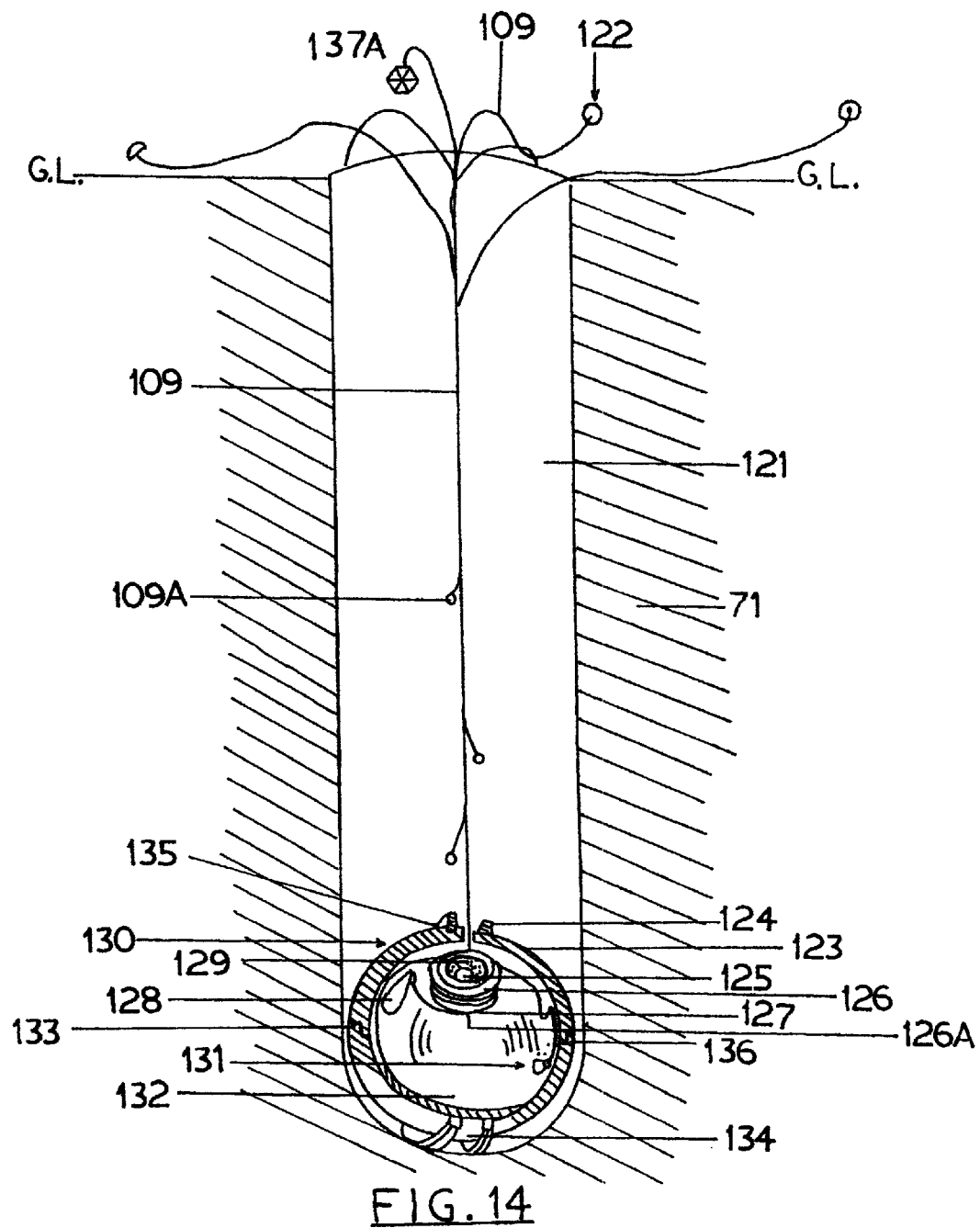
FIG. 14 is a sectional side elevation view of another embodiment of the present invention for planting seeds by machine.

Another embodiment of the present invention for plant seeds by machine is shown in FIG. 14. The seed is located inside a sack which is shaped like a baseball. Two upstanding tracks 124 are formed on the surface of the ball to provide a channel between them. The tracks 124 are adapted to engage with a groove 134 provided in the planting machine for guiding the dropping of a row of such balls 130, one ball at a time, into planting holes formed in the ground. The optical fiber 122 is also wound in this groove. One end of the optical fiber 122 is inserted into the ball through a slot 135 formed in the channel. The optical fiber 122 has an umbrella shape floatable plate located below its head; and the optical fiber is connected to an embryonic sack located in the ball. A water balloon is also located within the ball. The shell 123 of the ball is made of a mixture of fertilizer, fiber and water soluble glue. The upper and lower halves of the shell 123 are adhered together along a joint 136 between them. The ball is dropped into a planting hole previously formed on the ground by machine such that the ball will lie inside the hole suspended by the stretched out optical fiber. Also, the optical fiber is connected to a knife hook 131 which will cut open the thin soft plastic sheet side wall 133 of the water balloon when it is pulled by the stretched out optical fiber. The ball 130 will break into two halves along their joint 136 after a predetermined time period and will then begin to disintegrate. The tree seed 125 in the embryonic sack will also begin to grow in the water remaining on the not yet disintegrated lower half shell. The tree seed 125 is supported in a soft wood ring 126 which forms part of an embryonic sack for maintaining the seed to float on the water. The ring 126 lies on a piece of cotton cloth 126A. A cotton thread 127 is connected to the embryonic sack to prevent the latter from floating away in the event that the ground hole is filled with water. A weight 128 is connected to the other end of the cotton thread. The nutrient material 129 required for the seed grow is provided also in the embryonic sack. Optionally, a metal plated threading groove 137 may be formed in the housing to admit more light into the hole, and angular metallic reflecting particles 137A may also be used to reflect sun light into the hole.

Figure 15:
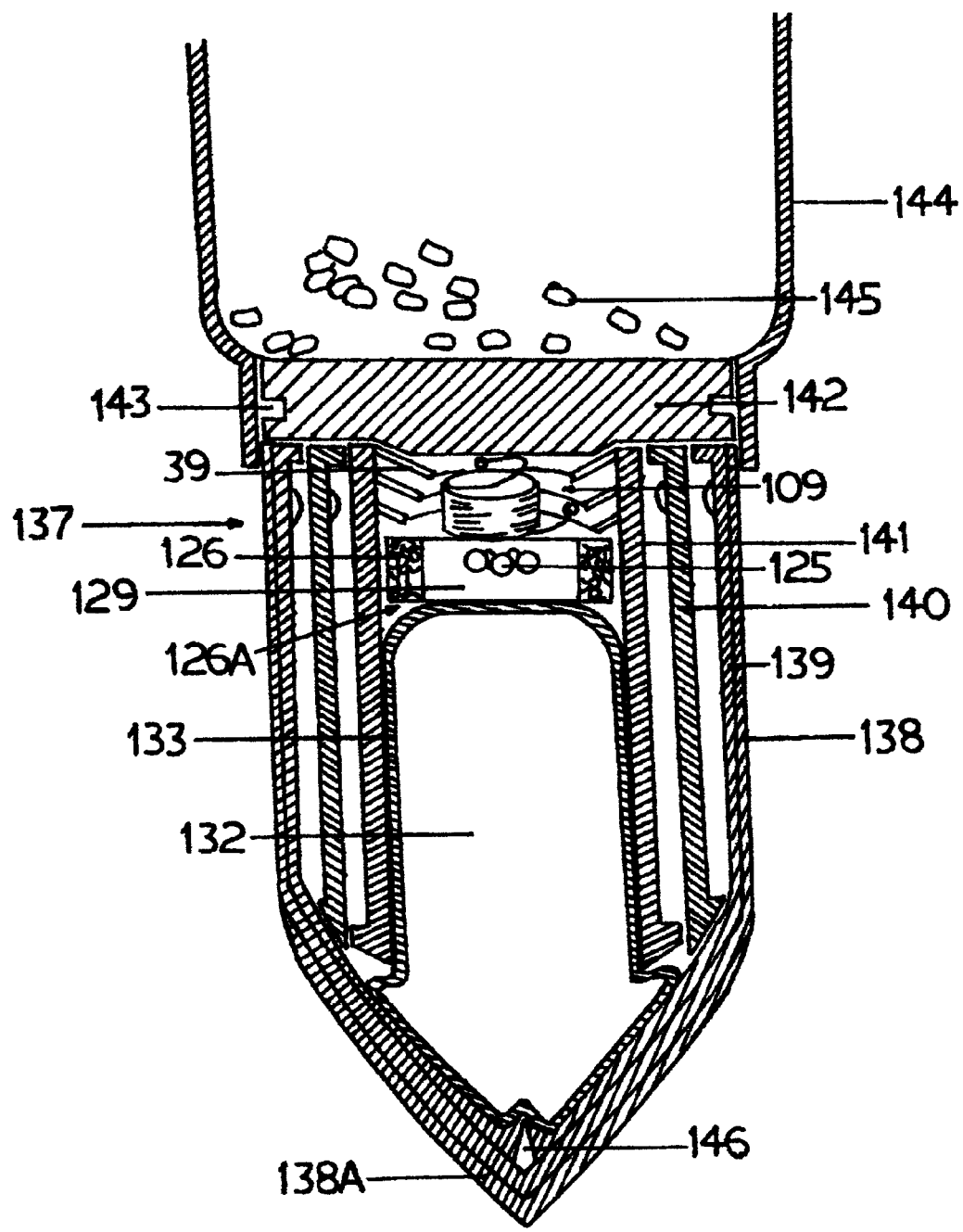
FIG. 15 is an isolated sectional side elevation view of the tree planting gun bullet for planting trees.
Figure 16:
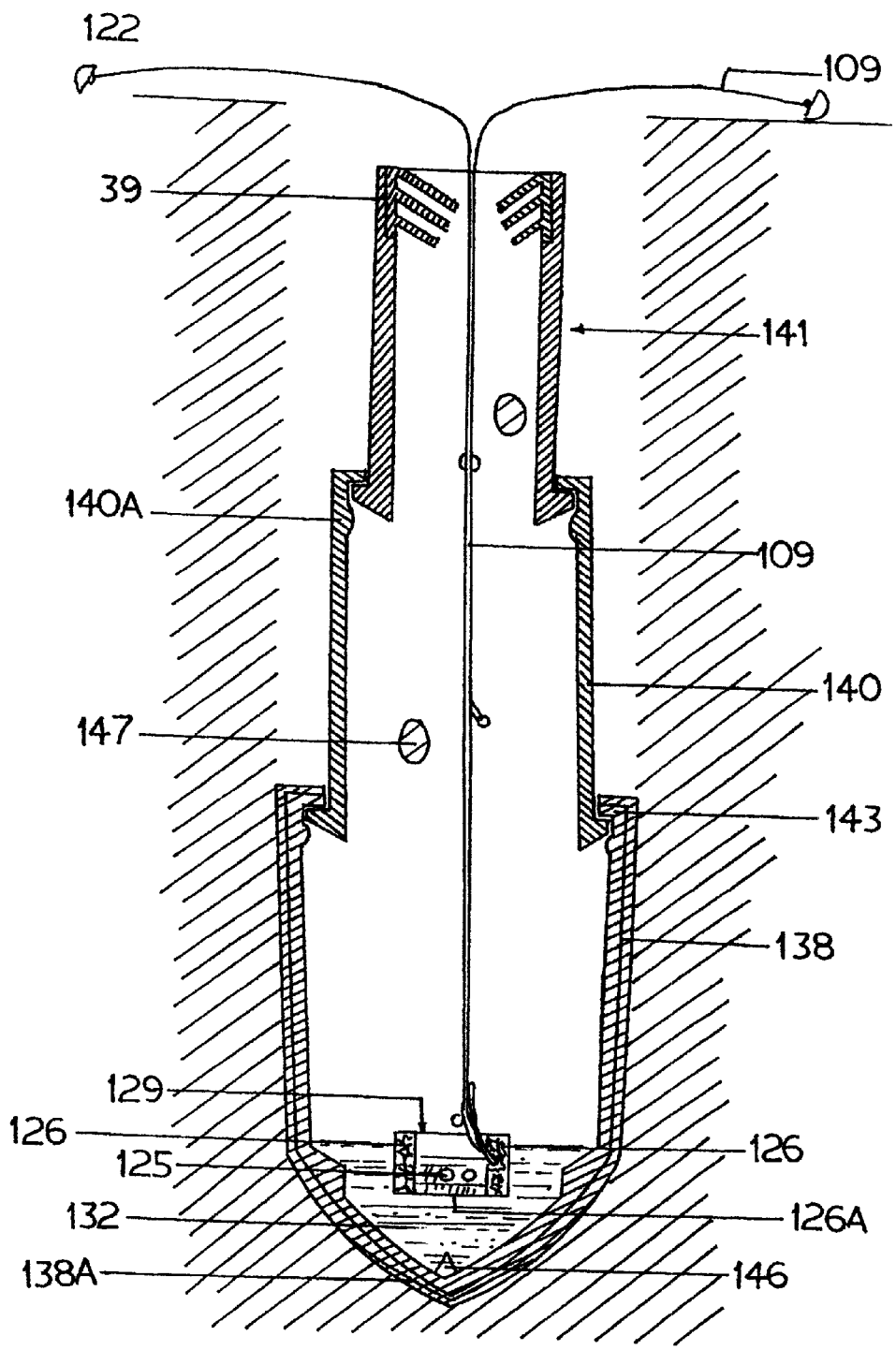
FIG. 16 is a sectional side elevation view of the A-shaped bullet after it has hit the ground.

An "A" shaped tree planting gun bullet is shown in FIG. 15. The bullet may be used for planting trees in regions in which water is depleting in rivers, dams and other water sources, or planting in eroded soil after a flood. It replaces the conventional method of having to carry the seedlings with back sacks to plant them one by one manually. This unique method of planting trees by bullets is important for improving the deteriorating environment around the world. The method is by placing a pre-dressed seedling in an embryonic sack with an optical fiber connected to it and it is then installed in a cavity at the rear end of a bullet. The installation is sealed with a heat resistance round plate 142. The other end of the optical fiber is attached to this heat resistance round plate so that the optical fiber is stretched during the flight of the bullet and it is subsequently used to conduct light into the bullet hole formed in the ground. A steel wire brush is located at the muzzle of the gun, which operate to pull the optical fiber out from the bullet as it is leaving the muzzle. The outer shell 138 of the bullet head is made of a mixture of hard wood powder, fiber and water soluble adhesive compacted together under high pressure. It will disintegrate and dissolve in water. The inner shell 139 is made of a mixture of fiber and high strength water soluble glue compacted together, and it is located over the inner surface of the outer shell 138. Since the "A" shaped bullet head may pierce too deep into the loose sand for growing the seed, it is designed to have a length equal to twice the length if it impacts with water. Steel is incorporated at the tip of the bullet head to enhance its piercing strength. The planting bullets are fired from a helicopter with a planting gun and the locations for planting may be accurately determined by the operator viewing a telescopic image of the ground displayed on a video screen. The optical fiber will be pulled out from the bullet head after the heat resistance plate has been removed by the steel wire brush. The umbrella like plate will float in the air like a flower pollen just above the ground after the planting bullet has entered the bullet hole so that light is conducted to the embryonic sack in the hole by the optical fiber. The water balloon is also broken by the impact. Due to the differences in soil characteristics and the amount of rainfall, the bullet head may have different constructions; however, the use of the removable heat resistance plate and the working principle remain the same regardless of whether an air gun or water gun is used to fire the bullet. The present system illustrates one example for tree planting. The present bullet planting method enables seeds to be planted anywhere and it meets the hope of those aware of the necessity to save the earth. The bullet may have a small diameter extensible inner shell section 140 which may slide upwards until its lower end latches with the second inner shell section so as to extend the length of the bullet head; and another smaller diameter third inner shell section 141 is slidable to latch with the top of the second inner shell section. It functions to increase the length of the bullet by three times. "/ \" shaped reverse flow regulating flaps 39 are provided at its upper portion. These flaps will operate to prevent water from escaping outward upwardly after the water balloon has been broken. A heat resistance plate 142 is provided for protecting the optical fiber, the tree seeds, the embryonic sack and the water balloon from the force and heat of the explosion in the bullet. Its diameter is equal to the rear end of the bullet head. Adhesive is provided in a round groove formed in the plate to attach the head of the optical fiber to it as well as attaching it to the bullet head. The heat resistance plate 142 has holes 143 formed around its side. The bullet cartridge 144 is similar to that of common bullets having gun powder 145. The bullet head has a sharp tip 146 with a metal protective head 138A. FIG. 16 shows a sectional side elevation view of the "A" shape bullet after it has hit the ground. Holes 147 are formed in the side of the cylindrical shell for admitting rain water into the shell or expelling water therefrom.

Figure 15A:
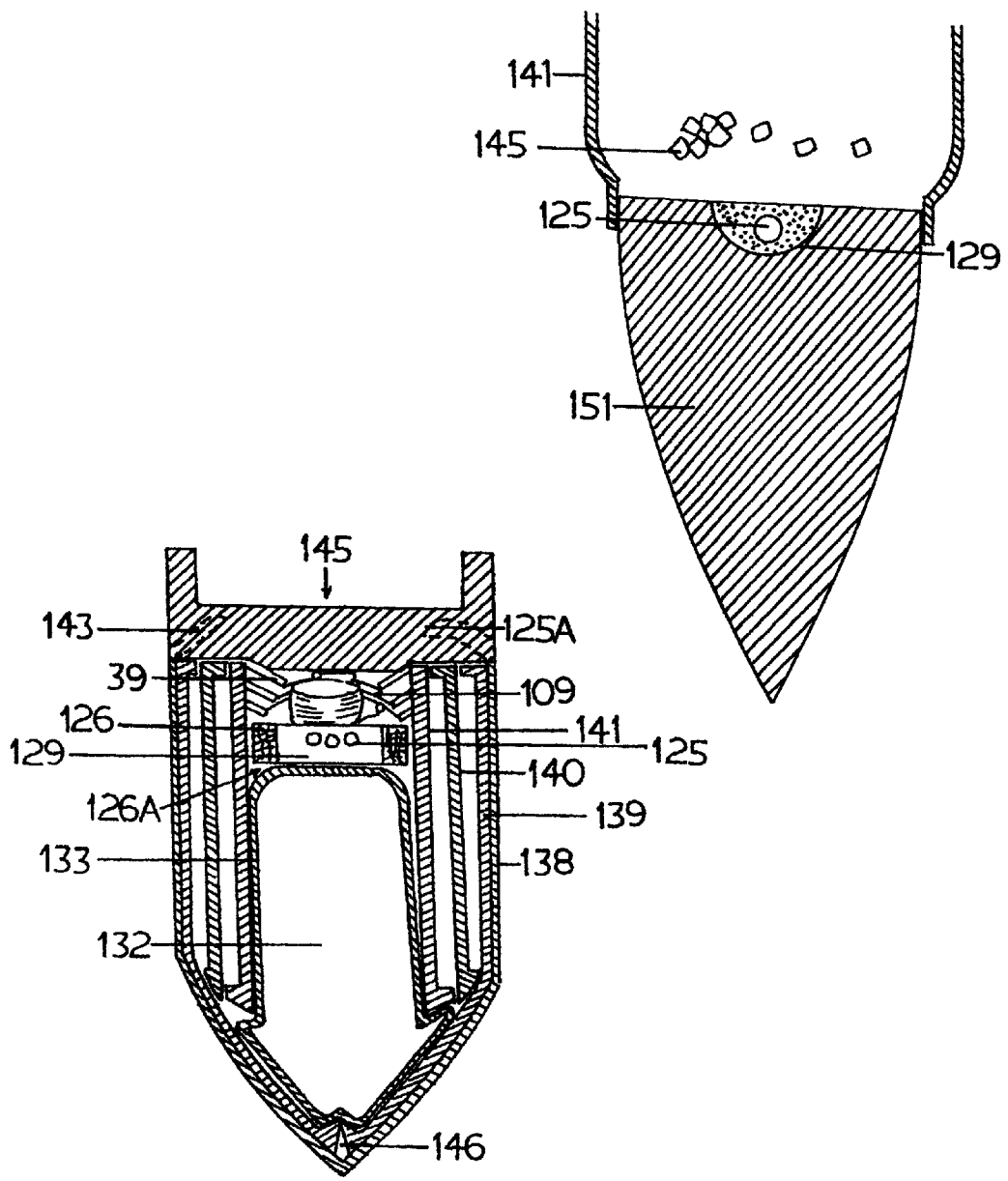
FIG. 15A is a sectional side elevation view of the planting bullet for use with an air gun for planting trees.
Figure 17:
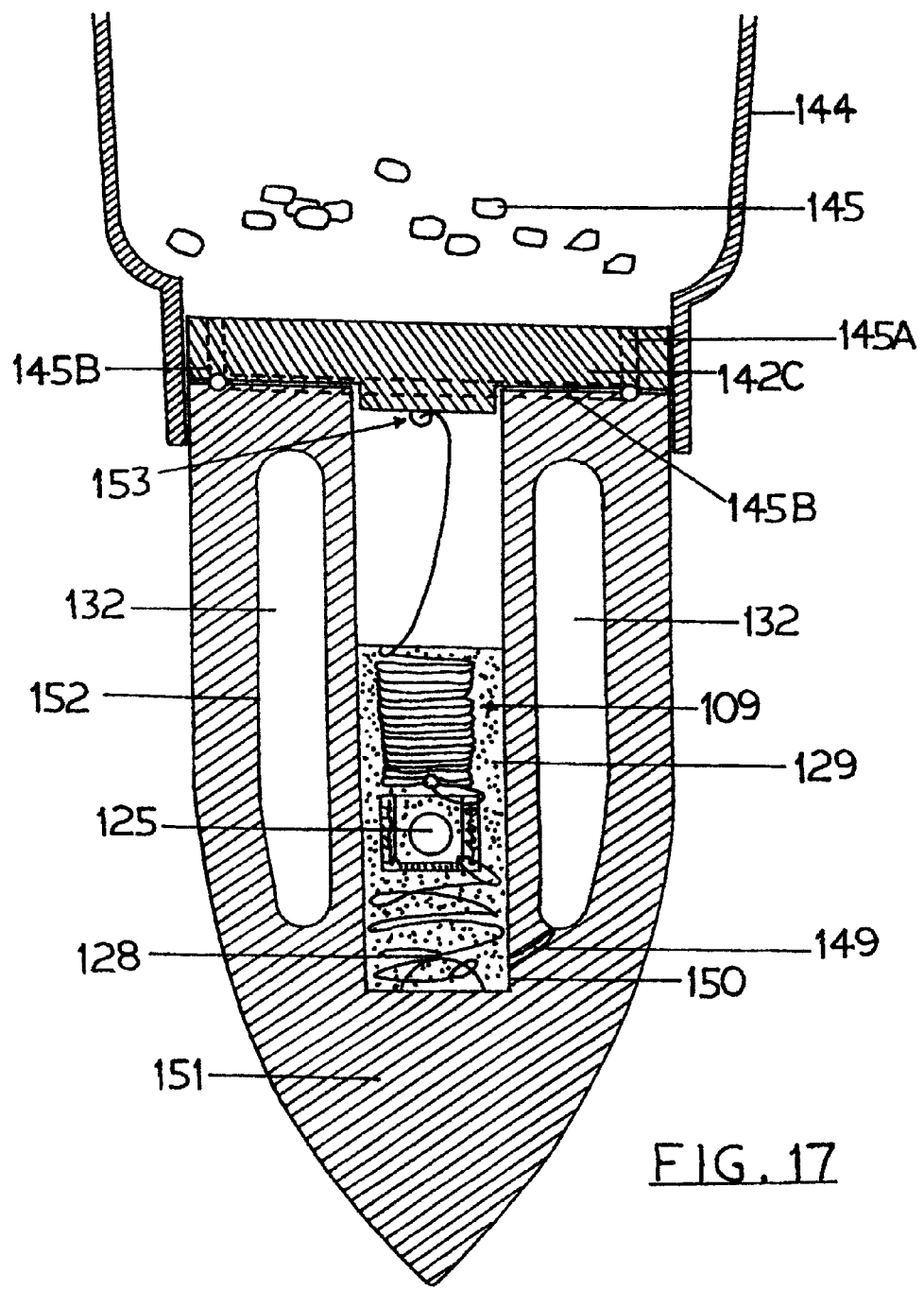
FIG. 17 is a sectional side elevation view of a B-shaped bullet head.
Figure 18:
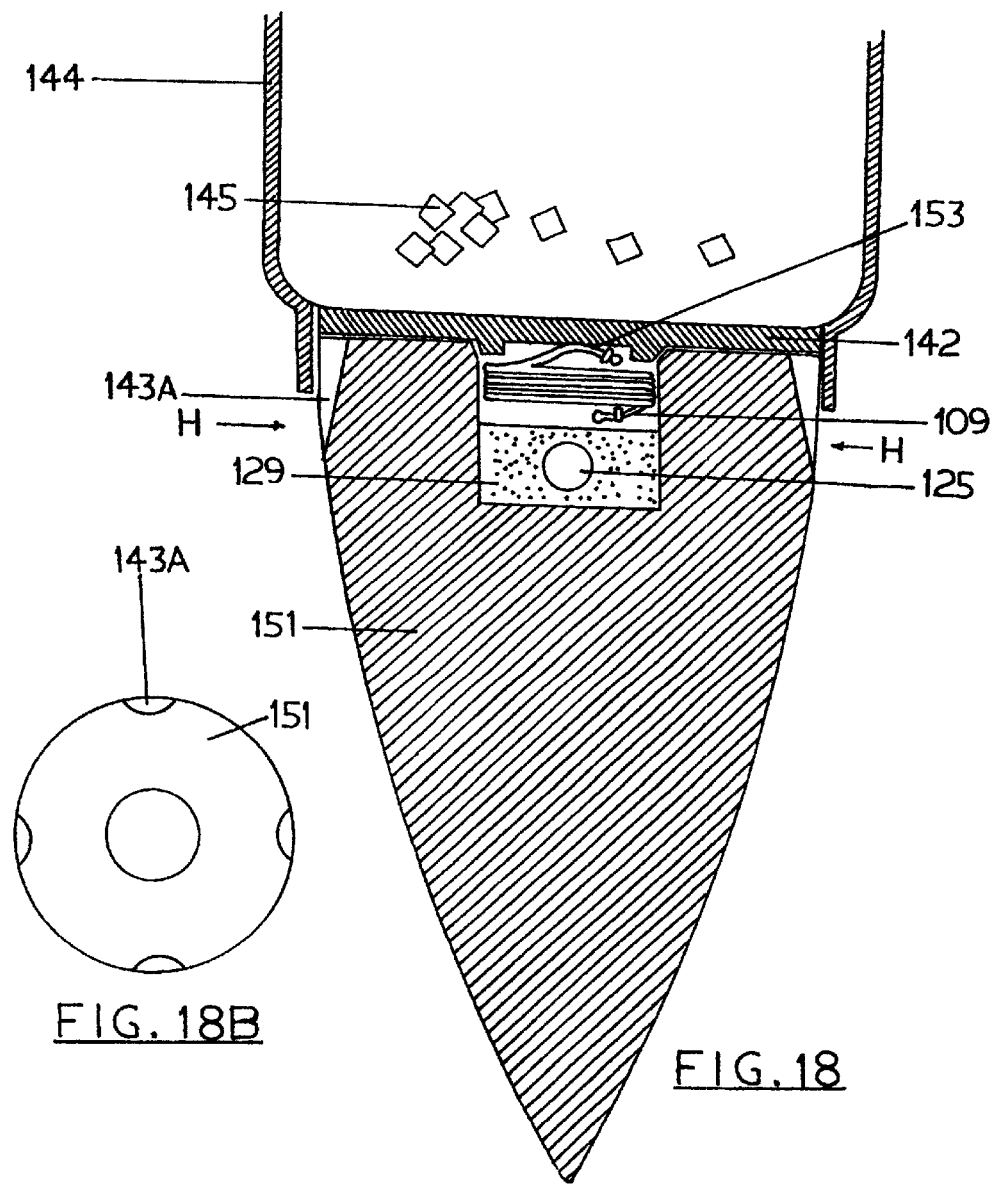
FIG. 18 is a sectional side elevation view of another embodiment of the bullet head provided with another heat resistance plate.

Another tree planting bullet embodiment is shown in FIG. 17. In this embodiment, a different design is employed for removing the heat resistance plate and in pulling the optical fiber outwards from the bullet head. As shown, small air holes 145A are formed in the circular plate. These holes 145A are inlets of a circular tunnel 145B formed by matching a circular groove formed on the plate and a similar circular groove is formed in the bullet head 151. Compressed air from the explosion of the gun powder would enter the tunnel to separate the heat resistance plate 142C from the bullet head. Therefore, it is not necessary to provide a steel wire brush at the muzzle of the gun to provide the same function. The water balloon 132 has a annular shape and it is located within an annular hollow cavity 152 in the bullet head wall. A sharp pin 149 is located at the bottom of the annular hollow cavity, which will break the water balloon when the bullet hits the ground. When the water balloon is broken, a regulated amount of water will flow quickly initially and then slowly through a duct 150 into the inner chamber due to pressure build up in the annular hollow cavity. The optical fiber is connected to the surface of the heat resistance plate 142 by an attachment 153. This construction is essential, such that the optical fiber will be pulled loose from the winding reel to conduct sun light subsequently into the bullet hole. Another embodiment of the bullet head provided with another heat resistance plate 142 design. A circular groove 143A is formed on the side wall of the bullet head rear portion. The air current force created by air resistance during the flight of the bullet would force the heat resistance plate to separate from the bullet head along the joint at which the heat resistance plate 142 and the bullet head 151 are adhered together. Thus, the two ends 153 and 109 of the optical fiber are attached to the surface of the heat resistance plate and the bullet head so that the optical fiber is pulled out when the plate separates from the bullet head. A groove 143A having a slanted wall is formed in the bullet head, which is shown in more detail in the sectional view in FIG. 18B along the section line H—H. A sectional side elevation view of the planting bullet for use with an air gun is shown in FIG. 15A. The above various bullet embodiments with the gun powder cartridge removed may be used for this purpose. In operation, the heat resistance plate 142A and the protruding outer ring serve to accept the compressed air pressure of the air gun to expel the bullet from the air gun. Such air gun may be used in low altitude air planting or incorporated in a ground planting machine.

Figure 19:
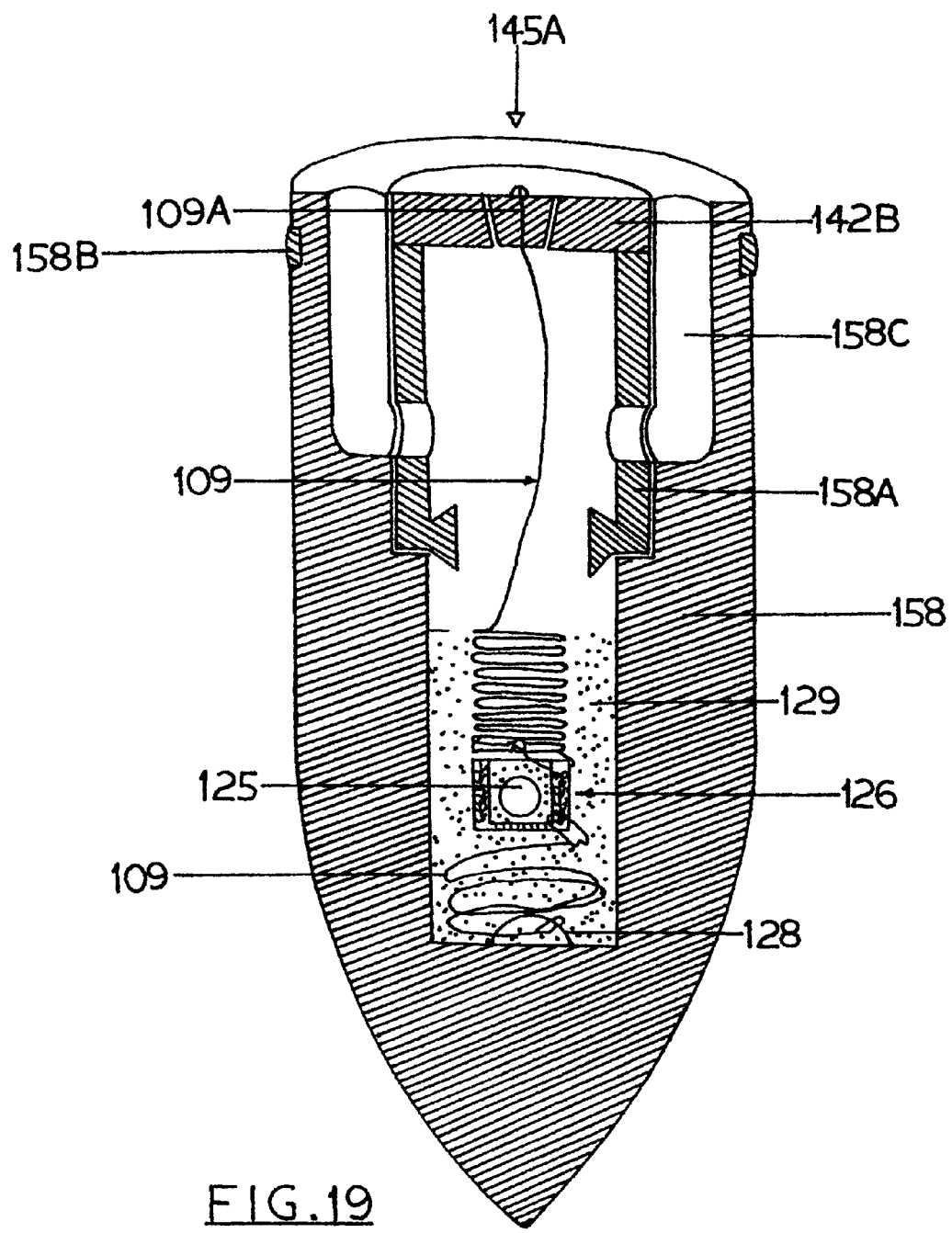
FIG. 19 is a sectional side elevation view of a planting bullet for use with a planting water gun.
Figure 24:
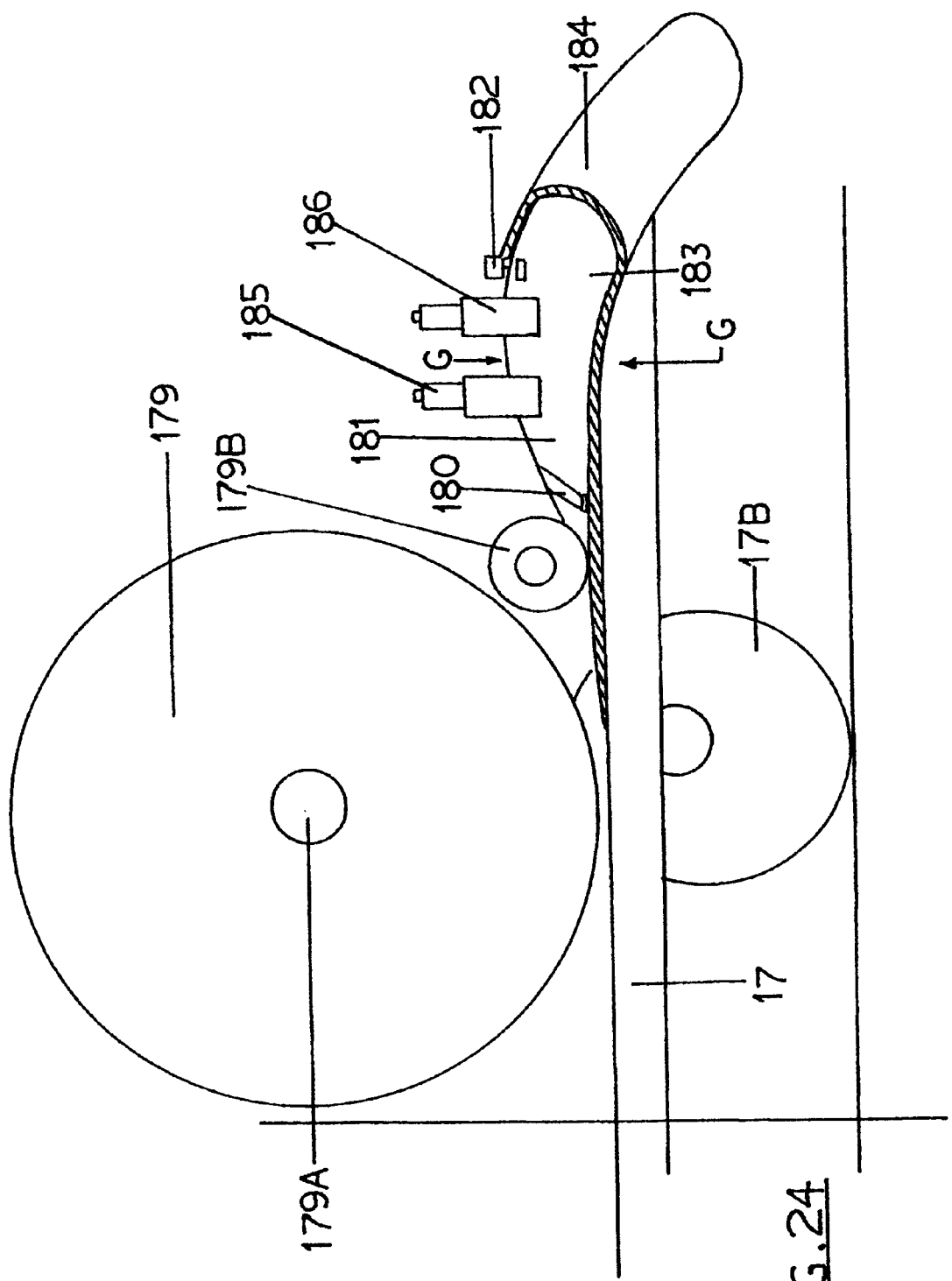
FIG. 24 is a sectional side elevation view along section line E—E of FIG. 23.

A planting bullet for use with a water gun is shown in FIG. 19. This type of bullet is suitable for use in a large dry area. The water gun is installed on a planting machine which shoots the bullet with high pressure water on to the ground which is already loosened by at three pairs of plows shaped like elephant tusks. The water gun mounted on the planting machine can thus automatically plant three 3 m wide rows of trees 115 m apart. A pressure plate 142B is located in the bullet head in this embodiment, which would be expelled by in interior water pressure within the bullet head. The bullet may be ejected from the water gun by a high pressure water stream 145A. The stream functions like the gun powder in a bullet cartridge to shoot at the rear end of the bullet head loaded in the gun barrel. Two holes extending into the central interior plant growing chamber are formed in the left and right sides of the bullet head rear end. A round cylinder precisely installed in the bullet head to prevent reverse pressure in two opposite directions. The high pressure water enters the interior chamber through the two holes to eject the pressure plate 142B outwards. The optical fiber 109 having one end attached to the center of the pressure plate and the other end attached to the embryonic sack support will be pulled out by the ejected pressure plate. The bullet has a round cylinder 158A for preventing reverse pressure in the opposite direction. Holes 158C extend into the interior chamber of the bullet head. A rubber ring 158B prevents the high pressure water from escaping between the bullet head and the gun barrel. The water gun bullet may also be used as an air gun bullet.

A life saving water balloon for the plant growth is shown in FIG. 19A. Plant and animal are alike, both would face life danger if lack of water. Even a drop of water may save its life by extending the chance of survival a little longer. For the same token, the chance also applies to the tens of thousands of tree roots in a dry region. The present water balloon can automatically break to feed the tree roots with water when every tree root has already reached the last limit of thirst. It is an air balloon filled with water. A wheel shape cutting blade 163 is mounted on a processed cow tendon 160 provided on a support 161 mounted on a base 162 which is adhered on the sealed surface of the water balloon. The length of the cow tendon will contract when the environment becomes very dry. Thus the contracting cow tendon is used to operate the cutting blade to cut open the water balloon to provide the water for the plant. This is the principle and construction of the life saving water balloon.

An embryonic sack for planting a tree seed in a ground hole is shown in FIG. 20. The sack has an attachment 164 connected to one end of the optical fiber. Several light heads are provided on the single optical fiber to provide sun light closely around the plant seed.

FIG. 21 is a side elevation view of the short annular steel wire brush 165 installed adjacent to the gun muzzle 168 by a bracket 167. It shows one of the embodiment of having the heat resistance plate 142 mounted at the rear end of the planting bullet, which will be removed at the moment the bullet is leaving the gun muzzle to cause the optical fiber to be pulled out. The removal of the heat resistance plate occurs when the groove 143 engages with the short steel wire of the steel wire brush located at the gun muzzle 168.

The fabricating machine for making the flexible soft brick of the present invention is shown in FIG. 22. A roll of continuous plastic bags 169 is used. The roll has an identification number 173 printed adjacent to the scored line marking the open end of each bag. The bags may be separated, one at a time, by tearing along the scored line. The bags 169 are continuously fed past below the sand filling station 175 at which a number reader is mounted on a telescopic rod 171 extending across the station for reading the identification number of the bag passing through the station. The sand box 175 contains a fixed amount of sand. A flat plate is located in the upper half of the sand box for closing the outlet 4 of the sand supply chamber. A small rubber ring, with a groove formed in it, is mounted on the telescopic rod 174. The ring presses on the bag with pressure. Thus, the rubber ring pulls the bag to open along the scored line. A simple computer (similar to that used in an automobile engine) senses the completion of the above operation to actuate a motor 170 to cause an offset mounted reciprocating rod 172 to open a chute in the sand box located at the filling station for dispensing a predetermined amount of sand by gravity into the open bag. As soon as the bag is filled, the chute will be shut off by the reciprocating rod which closes the outlet 4 of the filling station, and the sand box is replenished with the same amount of sand. The computer will then turn on the motor with an offset shaft 176 to actuate a pneumatically operated knife carrying rod to pull a heated knife blade 178 through a rotatable round coupling 177, to press on the bottom side of the filled bag adjacent to its open end for heat sealing the bag. The equally spaced rotatable rollers in the conveyor belt 17A will be actuated by the computer to pass the finished product out of the machine.

Figure 25:
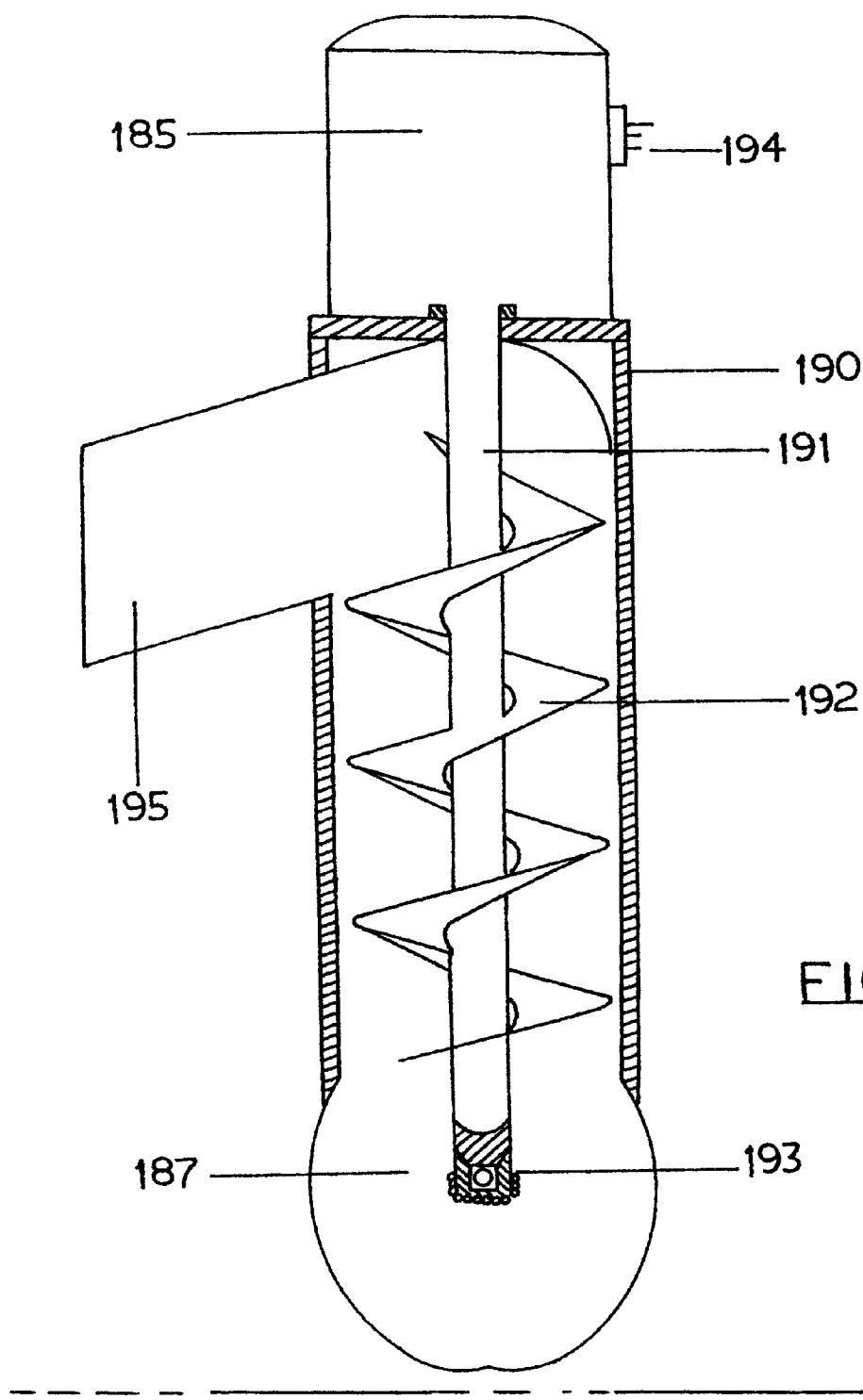
FIG. 25 is an enlarged sectional side elevation view of the sand collector.
Figure 26:
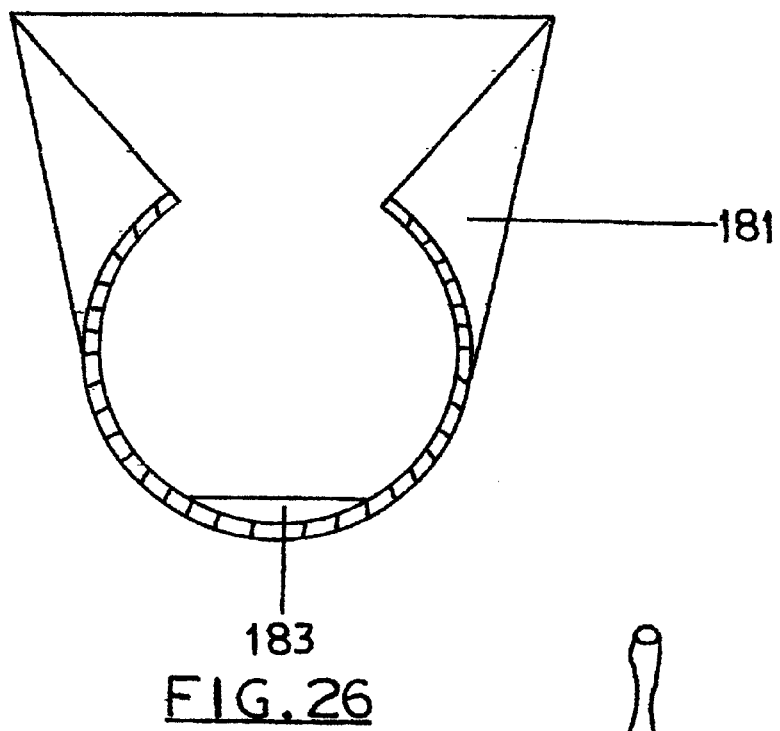
FIG. 26 is a sectional side elevation view along section line F—F of FIG. 23.

The desert improving bag production vehicle is shown in FIG. 23. It is used simply to carry a roll of plastic sheet for making a flexible soft brick of one kilometer in length, The elongated flexible soft brick may be laid quickly on the desert to cover and stabilize the sand around trees more than ten years old. The machine is simple and easy to use and it can travel for thousand miles in the desert. It can continuously produce and lay at the same time, and can travel from one horizon of the desert to the opposite horizon to lay the brick along the way continuously. A single layer plastic sheet 179 has mating zipper edges formed at its left and right side edges. The plastic sheet 179 passes through a guide slot 180 formed between two plates spaced from one another. A slide fastener 182 is located on the vehicle to link the zipper edges together to form a tube with the plastic sheet. Adhesive may also be additionally applied along the zipper joint. An wooden boat shaped funnel 181 is located above the slide fastener. The outlet of the funnel is a round tube 184 curving towards the ground. The slide fastener is fixedly mounted above the funnel. The plastic sheet is pulled by the planting machine in the production. After passing the long roller 179A, it is laid on a flat platform before being fed into the funnel mold. The edges are joined together as it passes through the heated slide fastener 182 to form the round shape tube. Sand is supplied to the round tube by the plow 189 in the planting machine which moves in front of the bag production vehicle to form a furrow on the ground. A groove 183 is formed in front of the round dispensing tube of the funnel to facilitate the flow of sand into the funnel. The plow 189 piles the sand on the two sides of the furrow for the sand retrieving plows 187 (see FIG. 25) located on the left and right sides of the production vehicle to collect and deliver to the funnel. A motor 188 provides the power to a lifting device for operating the plow 187 and the sand collectors 185 and 186. A vehicle 189A is used for tying the elongated sand bag into separate sections as well as forming openings (see FIG. 5E) in the bag so that these openings may admit rain water into the bag and seeds may be planted in the bag through them. The sand collector has a steel cylinder housing 190. A steel rotary shaft 191 is located in the housing 190. A spiral fin of the worm drive 192 is welded on the drive shaft 191 which is rotated by the motor 185 having electrical connecting terminals 194. An outer housing 193 of a ball shaped shaft is attached to the sand scoop. The sand collector has an exit hopper 195 which extends into the funnel located above the plastic sheet.

Figure 27:
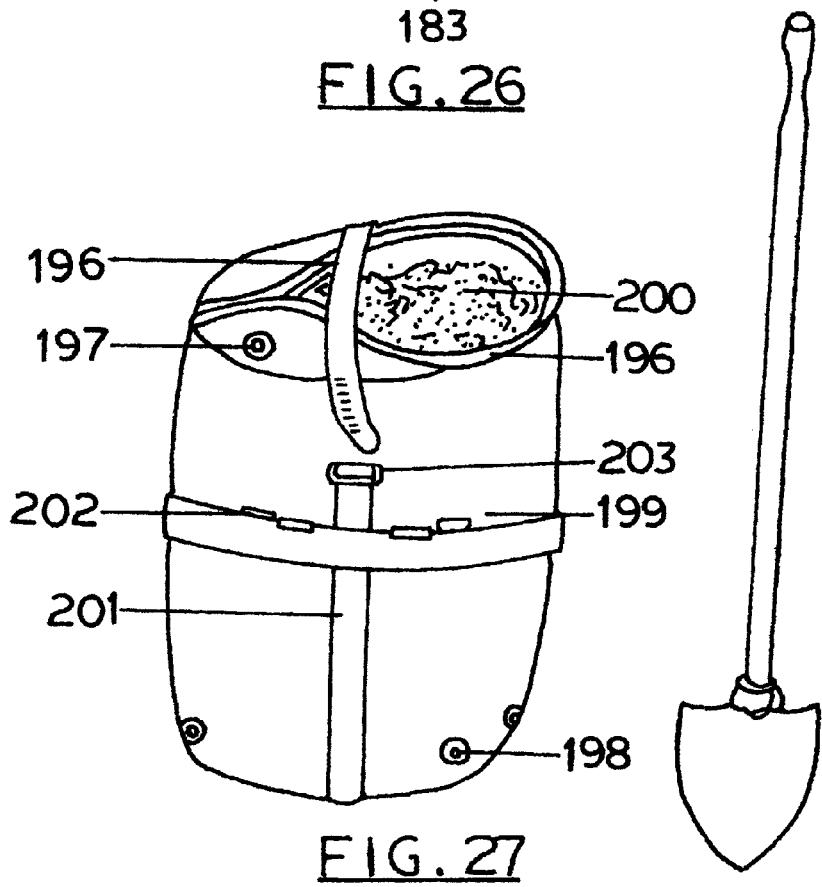
FIG. 27 is a perspective elevation view of a manually fabricated flexible soft brick according to the present invention.

A manually fabricated flexible soft brick according to the present invention is shown in FIG. 27. The bag has a tongue and groove sealing joint 196. A hole 197 is provided for expelling air from the bag or for admitting water or draining water from it. A reinforcing ring 198 is provided around the hole 197 to prevent tear. The brick is formed by filling a bag made of a plastic sheet 199 with sand and soil 200. A strengthening belt 201 is provided on the bag. The strengthening belt 201 may be secured in placed for example with a sliding hook 202 and a holding ring 203.

The advantages of the present invention are as follows:

1. The present invention is based on the principle of creating flexible soft bricks fabricated by holding basic natural material on earth with plastic bags. For example, as shown in FIG. 23 a desert improving vehicle can be used to fabricate a mile long flexible soft brick. It simplifies a complicated process and provides the unique method for reforestation.
2. Reforestation is a goal in protecting water erosion of the sand and soil as well as saving water. Normally, reforestation requires many years of good weather and rainfalls to achieve. The present invention eliminates such long time requirement. The method may be carried out immediately to provide protection of the soil and to save water. The result is equivalent to the benefit which can only be provided by ten-year old matured trees. It also provides protection of the newly planted trees and grass from harmful natural phenomena so that they may grow safely to maturity.
3. It provides an industrial mass production process for planting trees in a large scale. It improves production while reduces pollution of earth's important resources, and helps to reduce the greenhouse effect, and the threat of bad changes in the weather.
4. From now on, fertile lands are no longer cut off by deserts, and it is not necessary to move Beijin to the south to avoid the sand storm.
5. In view of the importance of wisdom and education, the inventor is willing to devote 30% of the profit derived from the present invention to students of poor families towards their education, whose parents are unable to afford such expenses. The whole amount to be used to supplement the school expenses and the students' living expenses. Another 20% is to be devoted to poor seniors.
6. It manufactures building material with low demand natural material that reduces pollution, and using the material to solve the earth's problems because of soil erosion and loss of water resource.
7. It may cooperate with the modern advanced engineering techniques to formulate the method for eliminating the cause of flood disasters.

What I claim is:

1. A system for growing planton sandy ground in a desert-like region comprising, a sealed plastic tent-like housing maintained in an upstanding erected condition by supporting rods, said housing having sand provided at a bottom portion therein for anchoring said housing on said ground to form a protective interior suitable for growing a plant, a first opening formed at the top of said housing for admitting air into the housing, a first reverse air flow preventing means provided at said first opening, a second opening formed at the top of the housing to provide another breathing opening and being operative to expel air from said housing when said housing is subjected to outside pressure, a second reverse air flow preventing means provided in said second opening, a third opening formed in said housing and operative to communicate with a water storage tank provided outside said housing, a floatable ball valve adapted in said first reverse air flow preventing means and operative to control the flow of water from said water storage tank through said third opening into said housing for feeding the plant, two wings mounted adjacent to said first opening and operated by outside wind for drawing outside air into said housing, an inlet air control valve coupled to said first opening by an air duct, an air balloon located in said duct, and said air balloon being connected to an evaporation dish located in said housing, said air balloon being operative by vapor generated from said evaporation dish to block said air duct when outside air is bot during the day time, a steel ball located in said air duct and being operative to block said air duct when too large amount of air is flowing through said air duct.

2. A system according to claim 1 including a heat pump consisting of a condensing lens having two outwardly curving surfaces and located in said housing, said condensing lens being operative to direct sun light on an upper end of a capillary tube extending to a water source at the bottom of said housing for pumping water upwards, said capillary tube having a back flow valve provided at a bottom end therein, and a V-shaped water trap located adjacent to an upper outlet end of said capillary tube.

3. A system according to claim 1 including a plurality of sealing water balloons located in the base of said housing, said water balloons having an automatic severing device consisting of a cow tendon and a cutting blade attached to the surface of said water balloon, the length said cow tendon having a variable length contracting when the air in said housing is dry beyond a predetermined amount so to operate said cutting blade to break said water balloons to provide water in said housing.

4. A system according to claim 1 including an air exhaust duct connected to said third opening, a filter cap adapted at an inlet end of said air exhaust duct located in said housing and having a multi-layer of paper for absorbing humidity from the exhausting air, said air exhaust duct having a water recovery portion buried in the sand in the base of said housing, and a fine metal wire mass being located in said water recovery portion to facilitate condensation of water vapor by the cool temperature in the sand for recovering water from the air in said exhaust duct.

5. A system according to claim 1 including a water storage tank mounted outside of said housing, a plurality of leaf shaped rain collectors mounted on the side of said housing and operative to collect rain water for storing in said water storage tank.

6. A system according to claim 5 including a UV ray reflection coating or color coating applied on the side wall of the housing for protecting the plant.

7. A system according to claim 5 wherein a lower portion of said housing is made of a self disintegrating material, and a soft plastic cap is mounted on top of said housing and operative to prevent outside blowing sand from entering said housing, and a plastic sheet is laid at the bottom of a round trench surrounding said housing and operative for collecting rain water in said round trench.

8. A system according to claim 7 including optical fiber, or a plurality of light reflecting means selected from the group consisting of metal foils, transparent mirror, and reflecting mirror for conducting sun light into said trench.

9. A system according to claim 7 including a sealed and partially water-filled plastic member located above the plant in said housing, said water-filled plastic member expanding to a flower petal shape to shield sun light from the plant by evaporation occurring inside when the water therein heated by the sun.

10. A system according to claim 9 including a sealed water balloon and an embryonic sack enclosing the plant seed, located in said planting ball.

* * * * *